US012628133B2

(12) United States Patent
Hahn et al.

(10) Patent No.: US 12,628,133 B2
(45) Date of Patent: May 12, 2026

(54) COMMUNICATION RESOURCE ALLOCATION USING TEMPORALLY BROADENING PILOT SIGNAL INFORMATION

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gene Back Hahn, Hwaseong-si (KR); Young Kil Suh, Hwaseong-si (KR); Ui Hyun Hong, Hwaseong-si (KR); Bum Jun Kim, Seoul (KR); Jeonghyeon Kwon, Seoul (KR); Wan Choi, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 309 days.

(21) Appl. No.: 18/618,681

(22) Filed: Mar. 27, 2024

(65) Prior Publication Data

US 2024/0267894 A1     Aug. 8, 2024

Related U.S. Application Data

(63) Continuation-in-part of application No. PCT/KR2022/014454, filed on Sep. 27, 2022.

(30) Foreign Application Priority Data

Sep. 27, 2021     (KR) ........................ 10-2021-0127531

(51) Int. Cl.
*H04W 72/04*     (2023.01)
*H04L 5/00*     (2006.01)

(52) U.S. Cl.
CPC ........... *H04W 72/04* (2013.01); *H04L 5/0048* (2013.01)

(58) Field of Classification Search
CPC ............. H04W 72/04; H04W 72/0453; H04W 72/23; H04W 72/535; H04L 5/0048;
(Continued)

(56) References Cited

U.S. PATENT DOCUMENTS 6,718,179 B1     4/2004 Forssell et al.
11,589,275 B2     2/2023 Nishiyasu et al.
(Continued)

FOREIGN PATENT DOCUMENTS

JP     6111095 B2     3/2017
KR     10-2001-0107861 A     12/2001
(Continued)

OTHER PUBLICATIONS

International Search Report dated Jan. 9, 2023 cited in International Patent Application No. PCT/KR2022/014454 (w/English translation).

*Primary Examiner* — Sun Jong Kim
(74) *Attorney, Agent, or Firm* — Morgan Lewis & Bockius LLP

(57)     ABSTRACT

A communication method and device may compensate for temporal broadening in a communication system. An operation method of a first communication node in a communication system, in the present disclosure, may include the steps of: transmitting, on a preset cycle, a first signal block including a pilot signal; receiving temporal broadening information about the pilot signal from a second communication node; allocating a communication resource to the second communication node on the basis of the temporary broadening information if communication with the second communication node is required; and communicating with
(Continued)

the second communication node by using the allocated communication resource.

18 Claims, 6 Drawing Sheets

(58) Field of Classification Search
  CPC .............. H04L 5/0007; H04L 27/2607; H04L 27/261; H04L 27/2646; H04L 5/00; H04L 27/26136; H04L 27/2666
  See application file for complete search history.

(56) References Cited

U.S. PATENT DOCUMENTS

| | | | | |
|---|---|---|---|---|
| 2002/0159537 | A1* | 10/2002 | Crilly, Jr. ............. | H04B 7/0617 |
| | | | | 375/267 |
| 2006/0046734 | A1 | 3/2006 | Costa et al. | |
| 2013/0301465 | A1* | 11/2013 | Seo ...................... | H04B 17/345 |
| | | | | 370/252 |
| 2014/0247795 | A1 | 9/2014 | Kim et al. | |
| 2017/0187564 | A1 | 6/2017 | Paredes et al. | |
| 2018/0062811 | A1* | 3/2018 | Akkarakaran ........ | H04L 5/0007 |
| 2020/0112498 | A1 | 4/2020 | Manolakos et al. | |

FOREIGN PATENT DOCUMENTS

| | | | |
|---|---|---|---|
| KR | 10-2005-0057674 | A | 6/2005 |
| KR | 10-1191220 | B1 | 10/2012 |
| KR | 10-2013-0069245 | A | 6/2013 |
| WO | 2018039519 | A1 | 3/2018 |

* cited by examiner

100

COMMUNICATION RESOURCE ALLOCATION USING TEMPORALLY BROADENING PILOT SIGNAL INFORMATION

CROSS-REFERENCE TO RELATED APPLICATION

The present application is a continuation-in-part of currently pending International Patent Application No. PCT/KR2022/014454, filed Sep. 27, 2022, which claims priority to Korean Patent Application Number 10-2021-0127531, filed Sep. 27, 2021, the entire contents of which are incorporated herein for all purposes by these references.

BACKGROUND OF THE PRESENT DISCLOSURE

Field of the Present Disclosure

The present disclosure relates to a communication technique in a communication system, and more particularly, to a technique for resource allocation considering temporal broadening in a communication system.

Description of Related Art

With the development of information and communication technology, various wireless communication technologies have been developed. Typical wireless communication technologies include Long Term Evolution (LTE), new radio (NR), 6th generation (6G) communication, and/or the like. The LTE may be one of 4th generation (4G) wireless communication technologies, and the NR may be one of 5th generation (5G) wireless communication technologies.

In order to process rapidly increasing wireless data, the 5G (or NR) communication or subsequent wireless communication technologies can support communication in relatively high frequency bands. For example, radio frequency bands used for wireless communication in the 5G (or NR) communication specifications may be broadly classified into frequency range 1 (FR1) bands and frequency range 2 (FR2) bands. Here, the FR1 bands may refer to relatively low frequency bands as compared to the FR2 bands, which are of about 7 GHz or below. The FR2 bands may refer to relatively high frequency bands as compared to the FR1 bands, which are of about 7 GHz or above. The FR2 bands may be 28-29 GHz bands, which include unlicensed bands, millimeter wave bands, and terahertz wave bands.

In the 5G (or NR) standardization meeting, research is being actively conducted to utilize a wide frequency band in the FR2 band, which is a relatively high frequency band. However, the current 5G (or NR) technical specifications do not have technical decisions on how to flexibly operate a wide frequency band depending on a situation.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

The present disclosure is directed to providing a method and an apparatus of allocating resources for efficient operations of a high frequency band.

The present disclosure is directed to providing a method and an apparatus of operating resources that resolve problems such as temporal broadening or path loss in a communication system using a millimeter wave band and/or terahertz wave band.

The present disclosure is directed to providing a method and an apparatus of determining a cyclic prefix (CP) symbol in a communication using a millimeter wave band and/or terahertz wave band and using an orthogonal frequency division multiplexing (OFDM) scheme.

A method according to an exemplary embodiment of the present disclosure, as an operation method of a first communication node in a communication system, may include: transmitting a first signal block including a pilot signal at a preset periodicity; receiving information on a temporal broadening of the pilot signal from a second communication node; allocating a communication resource to the second communication node based on the information on the temporal broadening when communication with the second communication node is required; and communicating with the second communication node using the allocated communication resource.

The information on the temporal broadening may be information on a time Ts' during which the pilot signal is measured at the second communication node.

The first signal block may include information on a transmission time Ts of the pilot signal.

The information on the temporal broadening may be information on a ratio of the transmission time Ts of the pilot signal to a time Ts' during which the pilot signal is measured at the second communication node.

In the allocating of the communication resource, the communication resource may be allocated to the second communication node based on a predetermined mapping rule, and the predetermined mapping rule may be configured to: divide a ratio of a transmission time Ts of the pilot signal to a time Ts' during which the pilot signal is measured at the second communication node into n predetermined ranges wherein the n is 2 or more; divide frequency resources allocatable by the first communication node into the n ranges; map the frequency resources to the n ranges of the ratio in order from high frequency to low frequency; and map the ratio of the transmission time Ts of the pilot signal to the time Ts' during which the pilot signal is measured at the second communication node to the n ranges from small to high values.

When the first communication node communicates in an Orthogonal Frequency Division Multiplexing (OFDM) scheme, the first communication node may determine one of three or more types of Cyclic Prefix (CP) symbol based on the information on the temporal broadening in allocating the communication resource.

In the allocating of the communication resource, the communication resource may be allocated to the second communication node based on a predetermined mapping rule, and the predetermined mapping rule may be configured to: divide a distance between the first communication node and the second communication node into a predetermined plurality of first ranges; divide frequency resources allocatable by the first communication node into the first ranges from high frequency to low frequency; map the frequency resources to the first ranges in order from high frequency to low frequency; and map the distance to the first ranges from a closest distance to a farthest distance.

The communication resource may be allocated based on a latency requirement of a service requested by the second communication node in allocating the communication resource.

The operation method may further include: transmitting information on a frequency resource set for transmitting the pilot signal before transmitting the first signal block.

An apparatus according to an exemplary embodiment of the present disclosure, as a first communication node in a communication system, may comprise: a transceiver configured to transmit and receive signals to and from at least one second communication node; and at least one processor, wherein the at least one processor may be configured to: control the transceiver to transmit a first signal block including a pilot signal at a preset periodicity; control the transceiver to receive information on a temporal broadening of the pilot signal from a second communication node; allocate a communication resource to the second communication node based on the information on the temporal broadening when communication with the second communication node is required; and control the transceiver to communicate with the second communication node via the allocated communication resource.

The information on the temporal broadening may be information on a time Ts' during which the pilot signal is measured at the second communication node.

The first signal block may include information on a transmission time Ts of the pilot signal.

The information on the temporal broadening may be information on a ratio of the transmission time Ts of the pilot signal to a time Ts' during which the pilot signal is measured at the second communication node.

The at least one processor may allocate the communication resource to the second communication node based on a predetermined mapping rule, and the predetermined mapping rule may be configured to: divide a ratio of a transmission time Ts of the pilot signal to a time Ts' during which the pilot signal is measured at the second communication node into n predetermined ranges wherein the n is 2 or more; divide frequency resources allocatable by the first communication node into the n ranges; map the frequency resources to the n ranges of the ratio in order from high frequency to low frequency; and map the ratio of the transmission time Ts of the pilot signal to the time Ts' during which the pilot signal is measured at the second communication node to the n ranges from small to high values.

When the first communication node communicates in an Orthogonal Frequency Division Multiplexing (OFDM) scheme, the at least one processor may determine one of three or more types of Cyclic Prefix (CP) symbol based on the information on the temporal broadening in allocating the communication resource.

The at least one processor may allocate the communication resource to the second communication node based on a predetermined mapping rule, and the predetermined mapping rule may be configured to: divide a distance between the first communication node and the second communication node into a predetermined plurality of first ranges, divide frequency resources allocatable by the first communication node into the first ranges from high frequency to low frequency; map the frequency resources to the first ranges in order from high frequency to low frequency; and map the distance to the first ranges from a closest distance to a farthest distance.

The at least one processor may allocate the communication resource based on a latency requirement of a service requested by the second communication node or a service to be provided to the second communication node in allocating the communication resource.

The at least one processor may further transmit information on a frequency resource set for transmitting the pilot signal before transmitting the first signal block.

An operation method of a first communication node in a communication system, according to an exemplary embodiment of the present disclosure, may include: receiving a first signal block including a pilot signal from a second communication node; measuring information on a temporal broadening based on a reception time of the pilot signal; providing the information on the temporal broadening to the second communication node; and in response to a communication resource allocated from the second communication node, communicating with the second communication node based on the allocated resource.

The information on the temporal broadening may be information on a ratio of a transmission time Ts of the pilot signal to a time Ts' during which the pilot signal is measured.

The resource allocation method and apparatus according to an exemplary embodiment of the present disclosure can resolve problems such as temporal broadening or path loss in a communication system using a millimeter wave band and/or terahertz wave band. In addition, according to an exemplary embodiment of the present disclosure, an appropriate CP suitable for a delay can be determined in a communication system using a millimeter Wave band and/or terahertz wave band and using the OFDM scheme. Through this, communication performance in the high frequency band can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
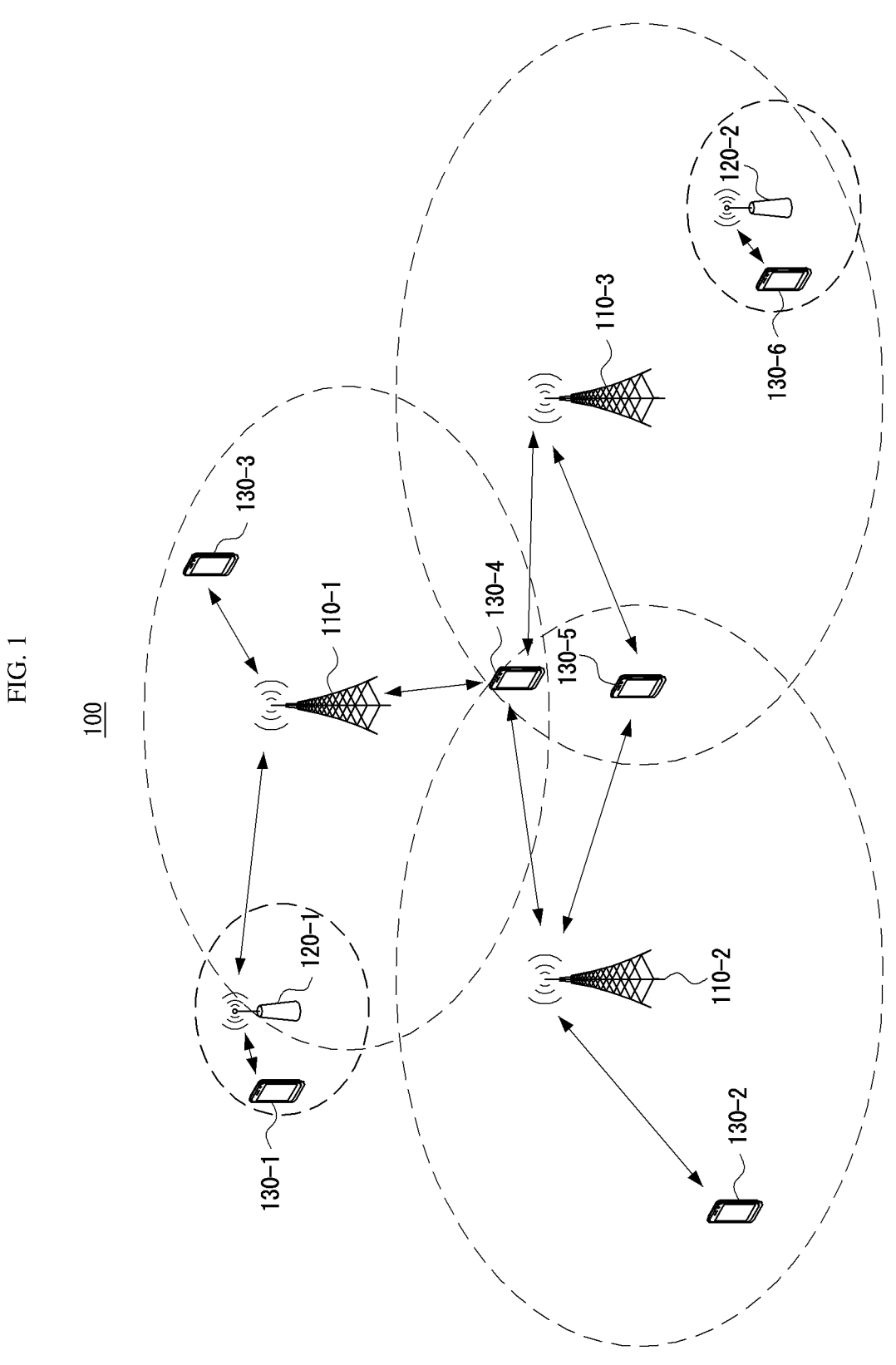
FIG. 1 is a conceptual diagram illustrating an exemplary embodiment of a communication system.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to an exemplary embodiment of the present disclosure are applied will be described. The communication system to which the exemplary embodiments according to an exemplary embodiment of the present disclosure are applied is not limited to the contents described below, and the exemplary embodiments according to an exemplary embodiment of the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a Global System for Mobile communication (GSM) or a Code Division Multiple Access (CDMA), 3G mobile communication network such as a Wideband Code Division Multiple Access (WCDMA) or a CDMA2000, 3.5G mobile communication network such as a High Speed Downlink Packet Access (HSDPA) or a High Speed Uplink Packet Access (HSUPA), 4G mobile communication network such as a Long Term Evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g. a serving gateway (S-GW), a packet data network (PDN) gateway (P-GW), and a mobility management entity (MME)). When the communication system 100 is a 5G communication system (e.g. New Radio (NR) system), the core network may include an access and mobility management function (AMF), a user plane function (UPF), a session management function (SMF), and the like.

The plurality of communication nodes 110-1, 110-2, 110-3, 120-1, 120-2, 130-1, 130-2, 130-3, 130-4, 130-5, and 130-6 may support communication protocols defined in the 3rd generation partnership project (3GPP) technical specifications (e.g. LTE communication protocol, LTE-A communication protocol, NR communication protocol, or the like). The plurality of communication nodes 110-1, 110-2, 110-3, 120-1, 120-2, 130-1, 130-2, 130-3, 130-4, 130-5, and 130-6 may support Code Division Multiple Access (CDMA) based communication protocol, Wideband CDMA (WCDMA) based communication protocol, Time Division Multiple Access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
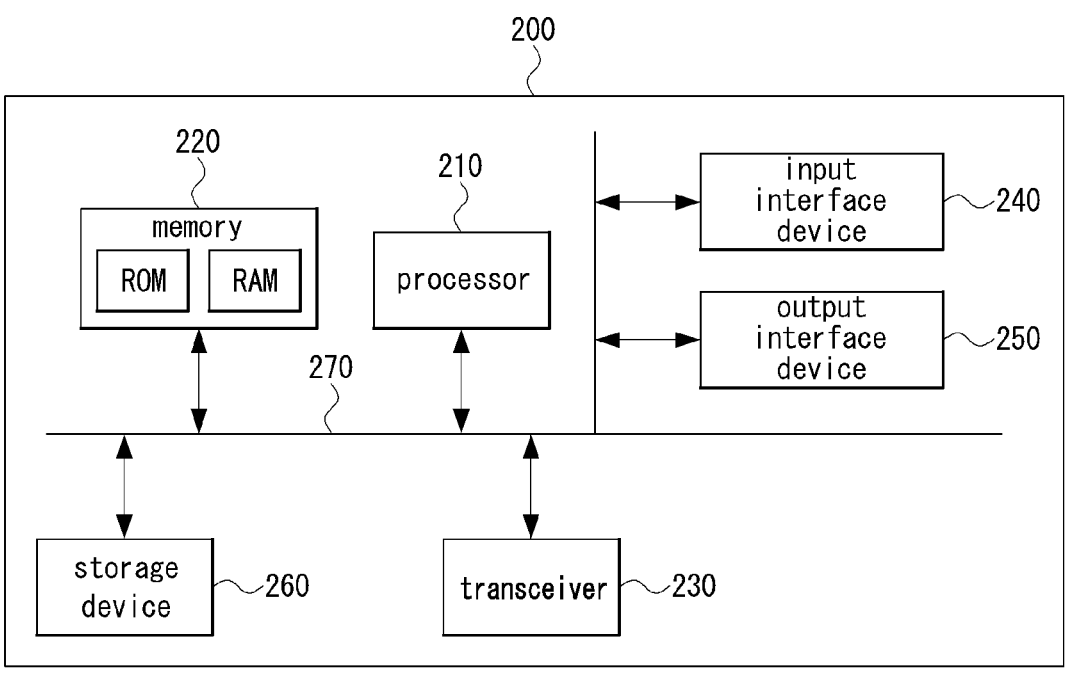
FIG. 2 is a block diagram illustrating an exemplary embodiment of a communication node constituting a communication system.

FIG. 2 is a block diagram illustrating an exemplary embodiment of a communication node constituting a communication system.

As shown in FIG. 2, an apparatus 200 may comprise at least one processor 210, a memory 220, and a transceiver 230 connected to the network for performing communications. Also, the apparatus 200 may further comprise an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to operations of the plurality of base stations 110-1, 110-2, 110-3, 120-1, and 120-2, operations supported by the plurality of base stations 110-1, 110-2, 110-3, 120-1, and 120-2, or the like. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, signal transmission and reception methods in a communication system will be described. Even when a method (e.g. transmission or reception of a data packet) performed at a first communication node among communication nodes is described, the corresponding second communication node may perform a method (e.g. reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In order to process rapidly increasing wireless data, the 5G (or NR) communication or subsequent wireless communication technologies can support communication in relatively high frequency bands. For example, radio frequency bands used for wireless communication in the 5G (or NR) communication specifications may be broadly classified into frequency range 1 (FR1) bands and frequency range 2 (FR2) bands. Here, the FR1 bands may refer to relatively low frequency bands as compared to the FR2 bands, which are of about 7 GHz or below. The FR2 bands may refer to relatively high frequency bands as compared to the FR1 bands, which are of about 7 GHz or above. The FR2 bands may be 28-29 GHz bands, which include unlicensed bands, millimeter wave bands, and terahertz wave bands.

In an exemplary embodiment of the communication system according to the NR communication specifications, the FR1 bands and FR2 bands may be defined as in Table 1.

TABLE 1

| Frequency Range (FR) | Corresponding frequency range |
| --- | --- |
| FR1 | 410 MHz~7125 MHz |
| FR2 | 24250 MHz~52600 MHz |

In an exemplary embodiment according to the NR communication specifications, conditions or requirements for radio communication may be defined identically or differently for the FR1 band and FR2 band. Operating bands in which communication nodes can communicate in the FR1 band may be defined as shown in Tables 2 and 3.

10

TABLE 2

| NR operating band | Uplink (UL) operating band BS receive/ UE transmit $F_{UL,low}$-$F_{UL,high}$ | Downlink (DL) operating band BS transmit/ UE receive $F_{DL,low}$-$F_{DL,high}$ | Duplex mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24[7] | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD[3] |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |

TABLE 3

| NR operating band | Uplink (UL) operating band BS receive/ UE transmit $F_{UL,low}$-$F_{UL,high}$ | Downlink (DL) operating band BS transmit/ UE receive $F_{DL,low}$-$F_{DL,high}$ | Duplex mode |
| --- | --- | --- | --- |
| n65 | 1920 MHz-2010 MHz | 2110 MHz-2200 MHz | FDD |
| n66 | 1710 MHz-1780 MHz | 2110 MHz-2200 MHz | FDD |
| n67 | N/A | 738 MHz-758 MHz | SDL |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |
| n96[4] | 5925 MHz-7125 MHz | 5925 MHz-7125 MHz | TDD[3] |
| n97[5] | 2300 MHz-2400 MHz | N/A | SUL |
| n98[5] | 1880 MHz-1920 MHz | N/A | SUL |
| n99[6] | 1626.5 MHz-1660.5 MHz | N/A | SUL |

Narrowband-Internet of Thing (NB-IoT) may operate in n1, n2, n3, n5, n7, n8, n12, n13, n14, n18, n20, n25, n26, n28, n41, n65, n66, n70, n71, n74, and/or n90 among the operating bands shown in Table 2 and Table 3 above.

In addition, the NR standard specification defines operating bands in which communication nodes can communicate in the FR2 band as shown in Table 4 below.

TABLE 4

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |
| n261 | 27500 MHz-28350 MHz | TDD |
| n262 | 47200 MHz-48200 MHz | TDD |

A channel bandwidth, and the like may be configured differently. As described above, in the NR communication specification, an appropriate operating band is allocated and operated according to a use and purpose of a communication environment.

Figure 3:
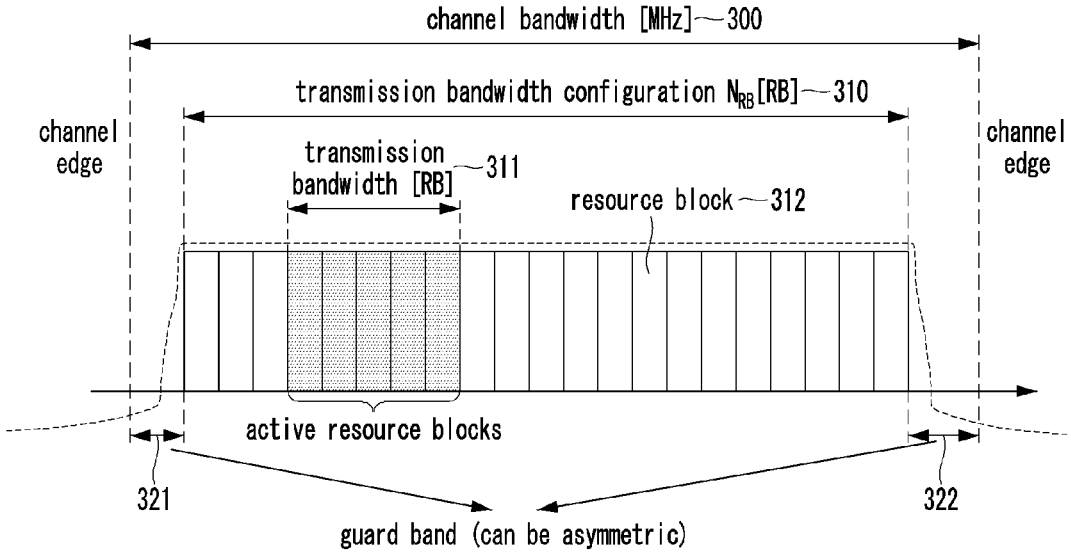
FIG. 3 is a conceptual diagram illustrating a channel bandwidth in the NR communication system.

FIG. 3 is a conceptual diagram illustrating a channel bandwidth in the NR communication system.

As shown in FIG. 3, a horizontal axis represents a frequency (f) band, and one channel bandwidth 300 corresponding to the frequency axis in the NR communication system is illustrated. The channel bandwidth 300 illustrated in FIG. 3 may be a base station (BS) channel bandwidth. The BS channel bandwidth may support one or more radio frequency (RF) carriers for downlink transmission or uplink reception of a base station.

For transmission and reception of one or more user equipments (UEs) (or terminals) connected to the base station, different UE channel bandwidths (or UE bandwidths) may be configured within the same spectrum as the BS channel bandwidth. The UE channel bandwidth for each UE may be configured statically or flexibly within the spectrum of the BS channel bandwidth for the base station to which the UE is connected.

The channel bandwidth 300 may include a transmission bandwidth configuration 310 capable of actually transmitting data. The transmission bandwidth configuration may include a plurality of carrier resource blocks (or resource blocks) 312. The base station may configure the UE channel bandwidth by allocating arbitrary carrier resource blocks within the transmission bandwidth configuration 310 to a specific UE. Accordingly, the base station may perform transmission and/or reception with the UE using resource blocks allocated to the UE channel bandwidth, for example, one or more resource blocks. In other words, one or more UE bandwidths (or UE bandwidth parts) each composed of resource blocks smaller than or equal to resource blocks constituting an RF carrier of the BS channel bandwidth may be configured within the BS channel bandwidth. Each UE may perform uplink or downlink communication with the base station through one or more UE bandwidths (or UE bandwidth parts) configured for the UE.

In the NR communication system, two or more channel bandwidths may be separated by channel edges in the frequency domain. Each channel bandwidth may be composed of a first guard band 321, the transmission bandwidth configuration 310, a second guard band 322, and the like. Within one channel bandwidth 300, the first guard band 321 and the second guard band 322 may be configured symmetrically or asymmetrically. In other words, within one channel bandwidth, the first guard band 321 and the second guard band 322 may have the same or different sizes.

The transmission bandwidth configuration 310 may be arranged between the first guard band 321 and the second guard band 322. The transmission bandwidth configuration 310 may refer to a set of resource blocks that can be used for transmission and reception within the channel bandwidth. The transmission bandwidth configuration may be composed of $N_{RB}$ resource blocks (RB). $N_{RB}$ may be a natural number greater than or equal to 1. The transmission bandwidth configuration 310 may include a transmission bandwidth 311 consisting of one or more active RBs. Information or signals may be transmitted and received through one or more active RBs constituting one or more transmission bandwidths. A value of $N_{RB}$, the size of the transmission bandwidth configuration 311, may be determined according to the size of BS channel bandwidth (MHz) and the size of subcarrier spacing (SCS) (kHz).

Table 5 and Table 6 below exemplify values of $N_RB$, the size of the transmission bandwidth configuration in the FR1 band and FR2 band, respectively.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In the NR communication system, conditions or requirements for transmission and reception of the base station or UE may be defined based on the transmission bandwidth configuration determined based on Table 5 or Table 6.

Meanwhile, a transmitter of the NR communication system transmits data using OFDM symbols. Accordingly, a receiver of the NR communication system may receive the OFDM symbols and extract data from the received OFDM symbols. In addition, an OFDM symbol may generally be classified into a form to which a cyclic prefix (CP) is added and a form without a CP. Currently, in most communication specifications such as the LTE and NR, data is transmitted using an OFDM symbol with a CP. Therefore, in the following description, an OFDM symbol may refer to an OFDM symbol according to the CP-OFDM scheme.

The CP may be used to remove inter-symbol interference (ISI) occurring due to a delay caused by multi-path propagation during signal transmission, by copying a last part of the OFDM symbol corresponding to a CP length and adding it to a start part of the OFDM symbol. Therefore, the CP length may be determined depending on a coverage (i.e. range or width thereof), frequency characteristics (or frequency band), and/or the like of the base station.

As described above, since the NR communication system uses various bandwidths and also uses various SCSs, a normal CP and an extended CP are defined. According to the NR standard specification, the normal CP may be used for all SCSs, and the extended CP may be supported only for an SCS of 60 kHz or higher. In addition, the same CP length may be used in an active downlink bandwidth part (DL BWP) and an active uplink bandwidth part (UL BWP) within the base station, excluding a supplementary uplink (SUL).

In addition to the NR system described above, if a wider frequency band than before, such as an unlicensed band of millimeter waves or a terahertz frequency band, is used in the future, an extreme path loss may occur in a specific frequency band. In addition, when communicating using the OFDM scheme in a high frequency band, a transmitted signal (or information) subjected to Fourier transform may undergo frequency-selective high attenuation in the frequency domain, and then may be transmitted after being inverse-Fourier-transformed. Accordingly, a temporal broadening phenomenon occurs in which a received signal becomes longer than the transmitted signal.

As a result, a very large frequency selectivity phenomenon in the high frequency band may lead to a delay spread in the time domain. Therefore, the scheme of utilizing a fixed CP for a specific SCS as currently stipulated in the NR technical specifications may not be suitable for dealing with the delay problem caused by the above-described temporal broadening in the high frequency band.

Therefore, in the present disclosure described below, techniques for allocating a frequency band suitable for a wideband channel condition and system requirements will be described. In addition, the present disclosure below will describe a method for responding to the temporal broadening phenomenon due to frequency-selective high attenuation in the high frequency band and a method for dynamically determining a CP accordingly.

Figure 4:
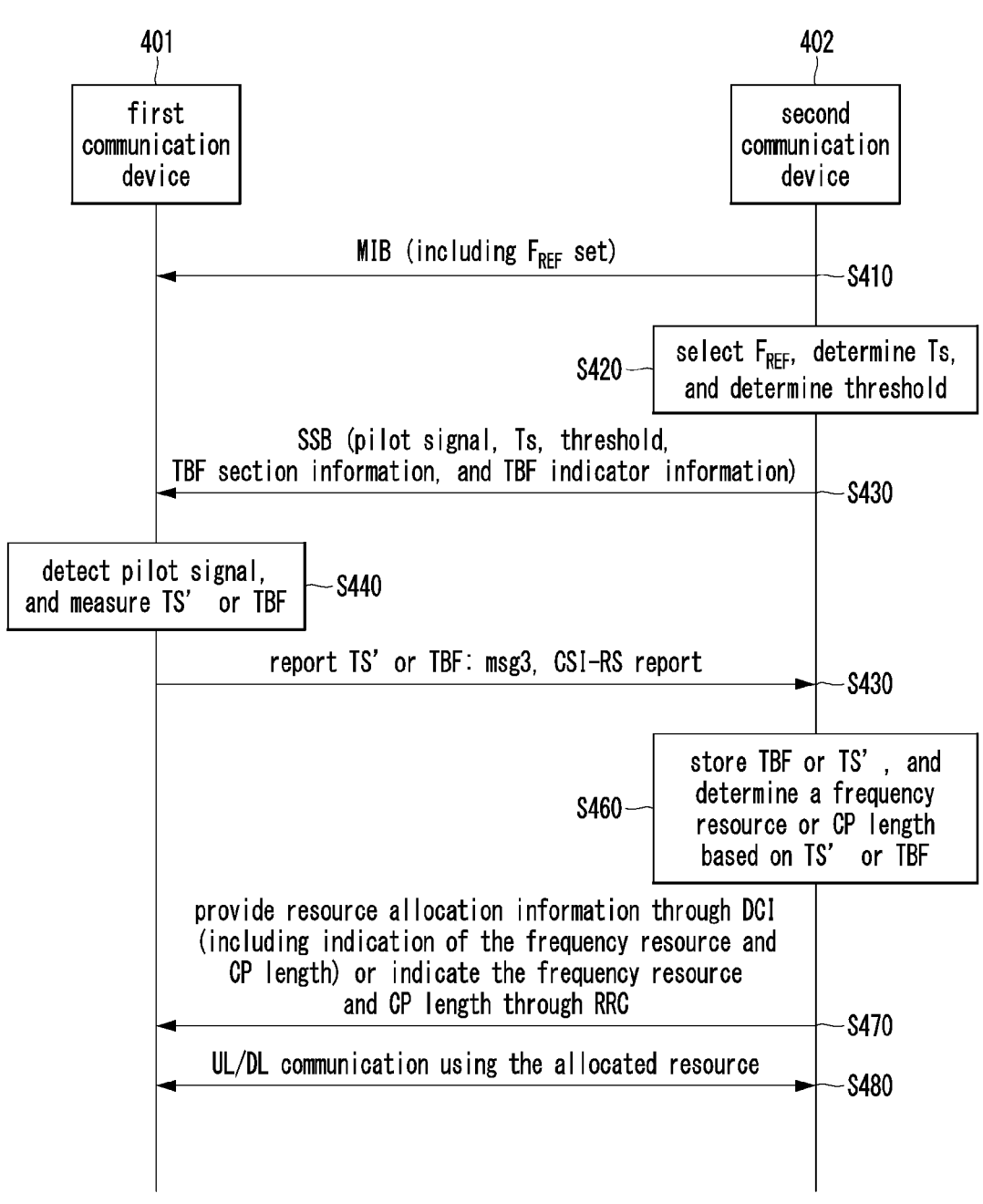
FIG. 4 is a diagram illustrating a signal flow for determining a frequency and/or CP length for communication between communication devices according to an exemplary embodiment of the present disclosure.

FIG. 4 is a diagram illustrating a signal flow for determining a frequency and/or CP length for communication between communication devices according to an exemplary embodiment of the present disclosure.

As shown in FIG. 4, each of a first communication device 401 and a second communication device 402 may be at least one of the communication devices 110-1, 110-2, 110-3, 120-1, 120-2, 130-1, 130-2, 130-3, 130-4, 130-5, and 200 previously described in FIGS. 1 and 2. The signal flow illustrated in FIG. 4 may be applied to the NR communication, an example of 5G communication that is currently being developed and whose services are provided. In addition, it may also be used in 6G communication, which is expected to use a higher frequency band than the 5G communication in the future. Both the first communication device 401 and the second communication 402 described below may be specific terminals and/or UEs. When the first communication device 401 and the second communication device 402 are both terminals (or UEs), a form of communication without a base station, such as direct (e.g. D2D) communication between terminals, IoT, and/or Vehicle To Everything (V2X), may be performed. The present disclosure may also be applied to such communication schemes between terminals.

However, in the following description, for convenience of description, the first communication device 401 is assumed to be a UE, and the second communication device 402 is assumed to be a base station equipment. In particular, in the following description, for convenience of description, it is assumed that the second communication 402 is a gNB, which is a base station equipment according to the NR communication specification among various base station equipments. Therefore, in the following description, the second communication device 402 may be understood as a gNB. However, the present disclosure may also be applied to 6G communication, which is expected to use a high frequency such as NR or a higher frequency band, without being limited to the NR communication. In addition, it may be applied to any wireless communication system that can adopt the methods described below.

According to an exemplary embodiment of the present disclosure, the second communication device 402 may transmit a master information block (MIB) at a predetermined periodicity (S410). The MIB transmitted in the step S410 may include information on a reference frequency set according to an exemplary embodiment of the present disclosure. The reference frequency set may be exemplified as shown in Table 7 below.

TABLE 7

| Reference frequency | Index |
| --- | --- |
| $F_{REF}$ #1 | 0 |
| $F_{REF}$ #2 | 1 |
| $F_{REF}$ #3 | 2 |
| $F_{REF}$ #4 | 3 |

In Table 7, reference frequencies may be a set of specific frequencies for measuring temporal broadening in one operating band according to an exemplary embodiment of the present disclosure. As previously described, the temporal broadening may mean a phenomenon in which a signal received by a receiver becomes temporally longer than a transmitted signal.

The reference frequency set may be, for example, a set of specific frequencies for measuring temporal broadening in one specific operating band illustrated in Tables 2 to 3 described above. As another example, when the second communication device 402 is capable of using two or more operating bands, the reference frequency set may be a set of specific frequencies for measuring temporal broadening across the entire band that the second communication device 402 can use. However, for convenience of description, it is assumed that all of the reference frequencies $F_{REF}$ #1, $F_{REF}$ #2, $F_{REF}$ #3, and $F_{REF}$ #4 exemplified in Table 7 exist within one operating band.

The four reference frequencies $F_{REF}$ #1, $F_{REF}$#2, $F_{REF}$#3, and $F_{REF}$#4 exemplified in Table 7 are merely an example, and the present disclosure is not limited to the number of reference frequencies exemplified above. According to an exemplary embodiment of the present disclosure, when the second communication device 402 determines a reference frequency, only one reference frequency may be configured within one operating band.

According to another exemplary embodiment of the present disclosure, the second communication device 402 may configure a plurality of reference frequencies within one operating band as exemplified in Table 7. Even in the case of having a plurality of reference frequencies within one operating band, it is not necessary to have four reference frequencies. For example, two or three reference frequencies and/or five or more reference frequencies may be configured within one operating band. Therefore, the number of reference frequencies exemplified in Table 7 is for illustrative purposes only and is not intended to limit the present disclosure.

As described above, the second communication device 402 may configure and announce the reference frequency set information exemplified in Table 7 by transmitting the MIB at a preset periodicity in the step S410. The reference frequency set information may be informed to the first communication device 401 in various forms. For example, a preconfigured mapping rule may be used between specific information included in the MIB and the reference frequency set information. For example, it may be assumed that the MIB includes first information, second information, and third information. In the instant case, the reference frequency set information may be mapped based on the technical specification according to the configuration of the first information, second information, and third information. In the instant case, information such as Table 7 may be implicitly informed.

According to another exemplary embodiment of the present disclosure, the reference frequency set information may be transmitted as being explicitly included in the MIB. According to yet another exemplary embodiment of the present disclosure, when a set of reference frequencies that can be used in a specific frequency band and/or operating band is predetermined by the communication specification, the first communication device 401 and the second communication device 402 may know the reference frequency set in advance. Therefore, the reference frequency set information may not be transmitted.

When the reference frequency set information is not predetermined by the communication specification, and the second communication device 402 configures and uses arbitrary reference frequency(ies) as needed, the second communication device 402 may inform an index of each reference frequency by informing the reference frequency set through the MIB or a signal broadcast (or transmitted) to terminals in the step S410. According to an exemplary embodiment of the present disclosure, when the reference frequencies $F_{REF}$ #1, $F_{REF}$ #2, $F_{REF}$ #3, and $F_{REF}$ #4 are used in a specific operating band A, an index may be assigned to each reference frequency to identify the respective two reference frequencies $F_{REF}$ #1 and $F_{REF}$ #2.

Therefore, in the step S410, whether to transmit the reference frequency set information and whether to transmit index information therefor may be optionally implemented, depending on how it is defined in the communication specification.

According to an exemplary embodiment of the present disclosure, the second communication device 402 may select a specific reference frequency to transmit a synchronization signal block (SSB) (S420). For example, if there are four reference frequencies $F_{REF}$ #1, $F_{REF}$ #2, $F_{REF}$ #3, and $F_{REF}$ #4 within one operating band as shown in Table 7, the second communication device 402 may determine at which reference frequency to transmit a pilot signal according to an exemplary embodiment of the present disclosure. According to an exemplary embodiment of the present disclosure, the pilot signal may be a reference signal for measuring temporal broadening. When the second communication device 402 can use four reference frequencies $F_{REF}$ #1, $F_{REF}$ #2, $F_{REF}$ #3, and $F_{REF}$ #4 within one operating band as shown in Table 7, it may also select all of the four reference frequencies.

The pilot signal according to an exemplary embodiment of the present disclosure may use RS(s) defined in the NR communication specification. The NR technical specification defines various types of RS, and the present disclosure exemplifies a case of using an RS transmitted through the SSB. However, the present disclosure is not limited to just the RS of SSB, and a signal periodically broadcast (or transmitted) from the base station to the terminal may be used as the pilot signal. However, for convenience of description, the following description will be made assuming that the pilot signal is an RS. Therefore, in the following description, when an RS signal is mentioned without special distinction, it may be understood as a pilot signal according to an exemplary embodiment of the present disclosure.

According to an exemplary embodiment of the present disclosure, the second communication device 402 may determine a pulse duration Ts of the pilot signal (S420). The pulse duration may be determined based on an SCS when it is determined based on the NR technical specification. According to another exemplary embodiment of the present disclosure, the pulse duration of the pilot signal may be determined separately to detect temporal broadening. When the pulse duration Ts is determined according to the SPS of the NR communication specification, determining of the pulse duration Ts may be omitted in the step S420. On the other hand, the second communication device 402, that is, the base station, may determine the pulse duration Ts. When the second communication device 402 determines the pulse duration Ts, the second communication device 402 may or may not notify information on the pulse duration Ts to the first communication device 401.

According to an exemplary embodiment of the present disclosure, when the second communication device 402 determines the pulse duration Ts of the pilot signal to an arbitrary value, the second communication device 402 may determine the same pulse duration for all reference frequencies within the same one operating band. According to another exemplary embodiment of the present disclosure, the second communication device 402 may determine to have a different pulse duration Ts for each reference frequency within the same operating band.

In addition, according to an exemplary embodiment of the present disclosure, the second communication device 402 may determine a threshold for measuring the pulse duration Ts in the step S410. As previously described, in the high frequency band, due to reasons such as frequency-selective high attenuation, a receiver may receive the pilot signal for a longer time than the pulse duration Ts of the pilot signal transmitted from the transmitter. In other words, temporal broadening of the pilot signal may occur. The second communication device 402 may need to be able to know the temporal broadening, that is, the lengthened time, of the pilot signal received from the first communication device 401. It may be necessary to determine a threshold for detecting the pulse duration of the pilot signal in the first communication device 401.

According to an exemplary embodiment of the present disclosure, the threshold for detecting the pulse duration may be preset between the first communication device 401 and the second communication device 402. According to another exemplary embodiment of the present disclosure, the threshold for detecting the pulse duration may be set by the first communication device 401 and provided to the second communication device 402. The threshold for detecting the pulse duration may be preset between the first communication device 401 and the second communication device 402, or may be determined by the second communication device 402 and notified to the first communication device 1401. Therefore, setting of the threshold may also be optionally performed in the step S420.

The threshold for the pilot signal according to an exemplary embodiment of the present disclosure will be described in more detail. In general, the pilot signal is information known to each other between a transmitter and a receiver. Therefore, when the transmitter, that is, the second communication device 402, transmits the pilot signal, the receiver, that is, the first communication device 401, may perform auto-correlation with respect to the pilot signal that is known in advance and obtain an estimation Ts' of the pulse duration. In general, in the communication system, an auto-correlation value may be most often set to 0.1%, that is, −30 dB interference level. When using such the general threshold, the pulse duration measurement value Ts' of the pilot signal may be obtained as follows.

The first communication device 401 may perform auto-correlation for the pilot signal in advance before a period in which the pilot signal is transmitted, and may identify that the pilot signal is actually transmitted from a time at which a −30 dB interference level is initially exceeded. Even after identifying that the pilot signal is transmitted, the first communication device 401 may continue to perform auto-correlation. The first communication device 401 may identify a time at which the interference level is below (or equal to or below) −30 dB as a result of the continuous auto-correlation. Therefore, the first communication device 401 may use a time counted from the time at which the auto-correlation result first exceeds (or becomes equal to or greater than) the −30 dB interference level to the time at which it falls below (or becomes equal to or lower than) the −30 dB interference level to obtain (or calculate) the pulse duration measurement value Ts' during which the pilot signal is transmitted.

The threshold for auto-correlation may be preset to a specific value, or the second communication device 402 may determine another specific value as the threshold. If a preset threshold is used, both the first communication device 401 and the second communication device 402 know the threshold, so they may be configured not to transmit the threshold. As another example, if a preset threshold is not used, the second communication device 402 may need to determine a threshold and inform the first communication device 401 of the threshold.

According to an exemplary embodiment of the present disclosure, the second communication device 402 may transmit SSB(s) (S430). Here, a frequency at which the SSB(s) are transmitted may be the reference frequency described in Table 7. In addition, the SSB transmitted in the step S430 may include at least one of the following information according to an exemplary embodiment of the present disclosure.

As described above, the second communication device 402 may include a pilot signal with a specific pulse duration Ts when transmitting the SSB in the step S430. According to an exemplary embodiment of the present disclosure, when the second communication device 402 sets the pulse duration Ts, the SSB may include information on the pulse duration Ts. According to another exemplary embodiment of the present disclosure, when the second communication device 402 may not include information on the pulse duration Ts in the SSB even when the pulse duration Ts is set by the second communication device 402.

The case where the information on the pulse duration is provided to the first communication device 401, which is a UE, according to an exemplary embodiment of the present disclosure may correspond to a case where the first communication device 401 calculates a temporal broadening factor (TBF) to be described later. The case where the information on the pulse duration is not provided to the first communication device 401 according to an exemplary embodiment of the present disclosure may correspond to a case where the second communication device 402, which is a base station, directly calculates the TBF.

According to an exemplary embodiment of the present disclosure, if a threshold is not preset between the first communication device 401 and the second communication device 402, the SSB may include information on the threshold. According to an exemplary embodiment of the present disclosure, the SSB may include information on TBF section(s) and information on TBF indicator(s). The TBF according to an exemplary embodiment of the present disclosure may be a value for obtaining information on a time when temporal broadening occurs. The TBFs according to an exemplary embodiment of the present disclosure may be exemplified as shown in Table 8 below.

TABLE 8

| Reference frequency | Temporal broadening factor (TBF) | TBF indicator |
|---|---|---|
| $F_{REF}$ #1 | TBF #1 | $n_A$ |
| $F_{REF}$ #2 | TBF #2 | $n_B$ |
| $F_{REF}$ #3 | TBF #3 | $n_C$ |
| $F_{REF}$ #4 | TBF #4 | $n_D$ |

In Table 8, the TBFs TBF #1, TBF #2, TBF #3, and TBF #4 may correspond to TBF indicators $n_A$, $n_B$, $n_C$, and $n_D$ respectively. In addition, each TBF among TBF #1, TBF #2, TBF #3, and TBF #4 may be determined as a value within a predetermined range. For example, TBF #1 may have a range of 1-3, TBF #2 may have a range of 3-5, TBF #3 may have a range of 5-7, and TBF #4 may have a range of 7-9. In addition, the TBF indicators $n_A$, $n_B$, $n_C$, and $n_D$ corresponding to the TBFs may have values of 0, 1, 2, and 3, respectively, in form of indexes. Accordingly, when four TBF indicators $n_A$, $n_B$, $n_C$, and $n_D$ exist as shown in Table 8, each TBF indicator may be expressed as 2 bits of information.

In addition, the reference frequencies $F_{REF}$ #1, $F_{REF}$ #2, $F_{REF}$ #3, and $F_{REF}$ #4 shown in Table 8 may represent that all the reference frequencies can use the TBFs and TBF indicators. For example, the TBFs TBF #1, TBF #2, TBF #3, and TBF #4 may be used for the first reference frequency $F_{REF}$#1. Similarly, the TBFs TBF #1, TBF #2, TBF #3, and TBF #4 may be used for the second reference frequency $F_{REF}$ #2, the TBFs TBF #1, TBF #2, TBF #3, and TBF #4 may be used for the third reference frequency $F_{REF}$ #3, and the TBFs TBF #1, TBF #2, TBF #3, and TBF #4 may be used for the fourth reference frequency $F_{REF}$ #4.

According to an exemplary embodiment of the present disclosure, the first communication device 401 may obtain the reference frequency set information from the MIB in the step S410. According to an exemplary embodiment of the present disclosure, the first communication device 401 may obtain at least one of the pilot signal, information of the pulse duration Ts, threshold, TBF section information, or TBF indicator information from the SSB in the step S430.

According to an exemplary embodiment of the present disclosure, the first communication device 401 may obtain the pulse duration estimation value Ts' of the pilot signal included in the SSB in the step S440. Since the method for obtaining the pulse duration has been previously described, the redundant description will be omitted.

According to an exemplary embodiment of the present disclosure, the first communication device 401 can identify the pulse duration measurement value Ts' and the pulse duration Ts, so that a ratio of the estimated time to the transmission time (i.e. Ts'/Ts) may be calculated. The calculated ratio may be the TBF previously described in Table 8.

According to another exemplary embodiment of the present disclosure, the first communication device 401 can identify the pulse duration measurement value Ts' and the pulse duration Ts, so that a difference between the estimated time and the transmission time (i.e. Ts'-Ts) may be calculated. According to another exemplary embodiment of the present disclosure, the TBF described in Table 8 may be replaced with the calculated difference. For convenience of description, the following description assumes that the ratio of the estimated time to the transmission time (Ts'/s) is the TBF. That is, the first communication device 401 may detect the pilot signal and obtain the TBF based on a result of the detection in the step S440.

The method described above may correspond to a case where the first communication device 401, which is a UE, calculates and reports the TBF. Therefore, the second communication device 402 may need to provide information on the pulse duration Ts. In addition, the TBF section information and the TBF indicator information may need to be provided.

According to an exemplary embodiment of the present disclosure, when the first communication device 401 calculates the TBF, the second communication device 402 may need to provide at least the following information through the SSB in the step S430.

When the first communication device 401 calculates the TBF, the SSB needs to include information on the transmission time Ts of the pilot signal, and may need to further include the TBF section information and the TBF indicator information. In addition, if a predetermined threshold is used between the first communication device 401 and the second communication device 402, the SSB may not need to include the threshold. On the other hand, if a predetermined threshold is not used between the first communication device 401 and the second communication device 402, the SSB may need to include a separate threshold.

According to another exemplary embodiment of the present disclosure, the second communication device 402 may calculate the TBF. When the second communication device 402 calculates the TBF, the second communication device 402 may provide only the pilot signal and the threshold through the SSB in the step S430. If the second communication device 402 and the first communication device 401 use a preset threshold, the second communication device 402 may transmit only the pilot signal through the SSB. That is, since the second communication device 402 calculates the TBF, information needed for calculating the TBF may not be transmitted in the step S430.

Accordingly, the first communication device 401 may measure only the pulse duration measurement value Ts' for the pilot signal received through the SSB.

As a result, according to an exemplary embodiment of the present disclosure, information transmitted in the step S430 may vary according to the first case (Case 1) in which the TBF is calculated by the first communication device 401 and the second case (Case 2) in which the TBF is calculated by the second communication device 402. According to an exemplary embodiment of the present disclosure, in both Case 1 and Case 2, the reference frequency set information may not be transmitted through the MIB in the step S410. In addition, when Case 2 is applied, the second communication device 402 may transmit only the MIB and SSB defined in the current NR technical specification in the steps S410 and S430, respectively.

In the instant case, the operation of the first communication device 401 according to an exemplary embodiment of the present disclosure and the operation of a general UE may differ only in that the first communication device 401 calculates the pulse duration measurement value Ts'.

Meanwhile, in an exemplary embodiment of the present disclosure, the basic operation of the first communication device 401 receiving SSB(s) and acquiring synchronization in the step S440 is well known to those skilled in the art, and thus description thereon will be omitted. According to an exemplary embodiment of the present disclosure, the first communication device 401 differs only in Case 1, which it calculates the TBF, and Case 2, which it measures the pulse duration in the step S440.

When the operation of step S440 is completed, the first communication device 401 may perform a step S450 at a specific time.

According to an exemplary embodiment of the present disclosure, as described above, according to Case 1 and Case 2, the first communication device 401 may report specific information to the second communication device 402 (S450). For example, in Case 1, the first communication device 401 may report the TBF to the second communication device 402 in the step S450. The first communication device 401 may report the TBF using the TBF indicator provided in Table 8 when reporting the TBF in the step S450.

In Case 2 where the first communication device 401 reports the pulse duration measurement value Ts' in the step S450, the first communication device 401 may report the pulse duration measurement value Ts' itself to the second communication device 402.

According to another exemplary embodiment of the present disclosure, the TBF may be implemented as shown in Table 9 below.

TABLE 9

| Temporal broadening factor (TBF) | TBF indicator (ceil($\log_2 n_{TBF}$) bits) |
|---|---|
| TBF #1 (=2) | $n_A$ (=000) |
| TBF #2 (=3.5) | $n_B$ (=001) |
| TBF #3 (=6) | $n_C$ (=010) |
| TBF #4 (=8.5) | $n_D$ (=011) |
| TBF #5 (=10.5) | $n_E$ (=100) |
| TBF #6 (=14) | $n_F$ (=101) |

Referring to Table 9, it is assumed that each second of the TBF is configured as follows. The second of TBF #1 has a value within a range of 3 or less, the section of TBF #2 may have a value within a range of 3 to 5, the section of TBF #3 may have a value within a range of 5 to 7, the section of TBF #4 may have a value within a range of 7 to 9, the section of TBF #5 may have a value within a range of 9 to 11, and the section of TBF #6 may have a value within a range of 11 or more.

In the case of the above ranges, the numbers in parentheses (e.g. xx in '=xx', xx is the calculated TBF) after the respective TBFs TBF #1, TBF #2, TBF #3, TBF #4, TBF #5, and TBF #6 in Table 9 may be the actual TRF values calculated in the first communication device 401. For example, if the calculated TBF is 2, Table 9 shows that it corresponds to TBF #1. Similarly, if the calculated TBF is 3.5, Table 9 shows that it corresponds to TBF #2, and if the calculated TBF is 6, Table 9 shows that it corresponds to TBF #3, and if the calculated TBF is 8.5, Table 9 shows that it corresponds to TBF #4. Also, if the calculated TBF is 10.5, Table 9 shows that it corresponds to TBF #5, and if the calculated TBF is 14, Table 9 shows that it corresponds to TBF #6.

Table 9 shows the number of TBF indicators according to the TBS sections being identified. That is, since the TBFs are divided into six sections, the TBF indicator may be represented with 3 bits of information. Specifically, TBF #1 may be mapped to 000 as $n_A$, TBF #2 may be mapped to 001 as $n_B$, TBF #3 may be mapped to 010 as $n_C$, TBF #4 may be mapped to 011 as $n_D$, TBF #5 may be mapped to 100 as $n_E$, and TBF #6 is may mapped to 101 as $n_F$. Accordingly, the TBF indicators may be determined based on the number of sections of the TBFs.

As described above, the first communication device 401 may report the TBF to the second communication device 402 using the index exemplified in Table 9 in the step S450. In the instant case, the first communication device 401 may perform uplink transmission.

According to an exemplary embodiment of the present disclosure, the reporting of the first communication device 401 may use a msg3 of a random access procedure (RACH procedure). In the instant case, if a reserved field exists in the msg3, the first communication device 401 may transmit the TBF using the reserved field. If a reserved field does not exist, the first communication device 401 may transmit the TBF using an additional field.

According to another exemplary embodiment of the present disclosure, the reporting of the first communication device 401 may additionally include the TBF in addition to CSI-RS report information at a time of CSI-RS reporting. If a reserved field exists in a CSI-RS report message, the TBF may be transmitted using the reserved field. If a reserved field does not exist, the TBF may be transmitted using an additional field.

Hereinafter, Case 2, in which the first communication device 401 does not calculate the TBF, will be described. The fact that the information provided in the steps S410 and S430 varies in Case 2 has been already described, and thus redundant description thereon will be omitted.

According to an exemplary embodiment of the present disclosure, the first communication device 401 may report the TBF or pulse duration estimation value Ts' to the second communication device 402 at a time of transmitting a message 3 (msg3) in the RACH procedure. In the instant case, the first communication device 401 may perform uplink transmission.

According to another exemplary embodiment of the present disclosure, the first communication device 401 may report the TBF or pulse duration estimation value Ts' during periodic CSI-RS reporting. This may be useful when the first communication device 401 periodically detects the pilot signal and makes periodic reports. In particular, downlink transmission from the base station to the UE may be performed in form of a burst. Therefore, according to an exemplary embodiment of the present disclosure, for downlink transmission with burst characteristics, an active state UE may be configured to periodically report the TBF or pulse duration estimation value Ts'.

According to another exemplary embodiment of the present disclosure, not only an active state UE, but also an inactive state UE and an idle state UE may be configured to report the TBF or pulse duration estimation value Ts' at a periodicity longer than that of the active state.

According to an exemplary embodiment of the present disclosure, when reporting the TBF, the first communication device 401 may transmit the indicator of Table 9 described above, so that the amount of information reported from the first communication device 401 to the second communication device 402 can be reduced.

According to an exemplary embodiment of the present disclosure, the second communication device 402 may receive the TBF or pulse duration measurement value Ts' in the step S450, and may store the received TBF or pulse duration measurement value Ts' in a step S460. According to an exemplary embodiment of the present disclosure, the second communication device 402 may temporarily store the TBF or pulse duration measurement value Ts' received from the first communication device 401. According to another exemplary embodiment of the present disclosure, the second communication device 402 may store the TBF or pulse duration measurement value Ts' received from the first communication device 401 until the next cycle. According to another exemplary embodiment of the present disclosure, the second communication device 402 may accumulate and store the TBF or pulse duration measurement value Ts'. If the TBF or pulse duration measurement value Ts' is accumulated and stored, the recently received value may be stored by being weighted.

In addition, according to an exemplary embodiment of the present disclosure, the second communication device 402 may calculate the TBF when receiving the pulse duration measurement value Ts'. For calculation of the TBF, a ratio of a time Ts during which the second communication device 402 actually transmits the pilot signal to the pulse duration measurement value Ts' received from the first communication device 401, and the TBF may be obtained using the ratio and Table 9 as shown above.

The operation described above assumes that the first communication device 401 is a UE and the second communication device 402 is a base station, and has been described based on the NR communication system. Additionally, it is assumed that the first communication device 401 performs an initial access procedure to the second communication device 402. However, according to an exemplary embodiment of the present disclosure, a radio resource control (RRC) message may be used to transmit the above-described information in an RRC connected state or RRC inactive state, when the first communication device 401 does not perform the initial access procedure. For example, the threshold value of the pilot signal, TBF section information, and TBF indicator information may be transmitted using an RRC reconfiguration request message of an RRC procedure. The RRC message may be used when the UE performs handover in the RRC active state, when the UE performs handover in the RRC idle state, and/or when a cell is changed in the RRC inactive state. For example, the second communication device 402 may transmit information to be provided to the first communication device 401 using a specific message according to the RRC procedure in the step S430. According to an exemplary embodiment of the present disclosure, when using an RRC message, the pulse duration Ts may be transmitted using a zeroCorrelationZoneConfig field of the RRC message. According to another exemplary embodiment of the present disclosure, when using an RRC message, the pulse duration Ts may be transmitted by defining a new field in the RRC message. In addition, the information in Table 8 described above may also be transmitted by using one of the existing fields of the RRC message or defining a new field in the RRC message.

According to an exemplary embodiment of the present disclosure, the second communication device 402 may perform the step S460 when communication with the first communication device 401 is required. The second communication device 402 may determine a frequency band to communicate (or a specific center frequency in the operating band) based on the received or stored TBF or pulse duration measurement value Ts' in the step S460, and determine a CP length. The temporal broadening described above may increase as the center frequency becomes higher, a distance between the base station and the terminal increases, or the pulse duration becomes shorter. Therefore, when determining the frequency band, the frequency band (or a specific center frequency in the operating band) may be determined based on the TBF or pulse duration measurement value Ts' received from the first communication device 401. For example, the temporal broadening may be reduced by assigning a lower frequency to a larger TBF or pulse duration measurement value Ts'.

Additionally, the CP length may be additionally determined if necessary. When transmitting an OFDM symbol in a high frequency band, ISI may occur due to the temporal broadening in which the length of a received signal becomes longer than a CP length at the receiver. This reduces communication efficiency. Therefore, in an exemplary embodiment of the present disclosure, the CP length may be additionally determined to solve this problem. In the present disclosure, the CP length may be basically set to be longer in proportion to the temporal broadening.

Then, the CP length extension according to the existing technical specification and the present disclosure will be described. In the NR communication system, one of the 5G communication specifications, two types of CP length are defined: normal CP and extended CP. According to an exemplary embodiment of the present disclosure, the two types of CP length (i.e. normal CP and extended CP) may be used as in the NR system. The CP may be a redundancy used to remove ISI, as described previously. Therefore, the CP is generally determined based on a communication range (distance) of the base station in the communication system. However, as the communication system uses a higher frequency, the NR communication scheme uses the normal CP or extended CP according to an SCS.

In the present disclosure, additional CP(s) may be considered in addition to the two types of CP. According to another exemplary embodiment of the present disclosure, the CP may have at least three length values based on the TBF or the pulse duration estimation value Ts'.

According to various exemplary embodiments of the present disclosure, the CP may have three lengths, and they may be defined as a first CP type (Type 1 CP), a second CP type (Type 2 CP), and a third CP type (Type 3 CP). The first CP type may be the normal CP of the NR system. The second CP type may be the extended CP of the NR system. The third CP type may be a CP with a longer length than the second CP type. According to an exemplary embodiment of the present disclosure, one CP length may be defined as a CP length with a specific value that is longer than the extended CP length. A scheme of establishing the relationship between the normal/extended CPs of the NR system and the first, second and third CP types may be different from the above example. For example, the first CP type may be the normal CP of the NR system. The second CP type may have an intermediate value between the normal CP and the extended CP of the NR system. The third CP type may be the extended CP of the NR system.

According to various exemplary embodiments of the present disclosure, the CP may have four lengths, and they may be defined as a first CP type (Type 1 CP), a second CP type (Type 2 CP), a third CP type (Type 3 CP), and a fourth CP type (Type 4 CP). The first CP type may be the normal CP of the NR system. The second CP type may be the extended CP of the NR system. The third CP type may be a CP of a longer length than the second CP type. The fourth CP type may be a CP with a longer length than the third CP type.

The CP length described above may be determined by considering temporal broadening. There may be various options that can be performed by the second communication device 402 in consideration of temporal broadening. The step S460 of the present disclosure may correspond to a case where the frequency and the CP length are considered among various options.

According to an exemplary embodiment of the present disclosure, a relationship between CP lengths and TBFs may be exemplified as shown in Table 10 below.

TABLE 10

| Temporal broadening factor (TBF) | Required cyclic prefix length | Cyclic prefix type |
|---|---|---|
| TBF #1 | CP #1 | Type 1 CP |
| TBF #2 | CP #2 | Type 2 CP |
| TBF #3 | CP #3 | Type 3 CP |
| TBF #4 | CP #4 | Type 4 CP |

The description of Table 9 may be applied equally to the TBFs TBF #1, TBF #2, TBF #3, and TBF #4 in Table 10. That is, a larger TBF may ultimately mean that the impact of temporal broadening is larger. Therefore, a CP of a longer length may be required.

According to an exemplary embodiment of the present disclosure, a CP type may be changed after allocating a frequency if temporal broadening is not sufficiently resolved even through the allocated frequency. Therefore, the example in Table 10 may correspond to CP types used when temporal broadening is not sufficiently resolved after frequency allocation.

According to another exemplary embodiment of the present disclosure, if a frequency to resolve temporal broadening is not allocated, a CP type may be determined based on the TBF, as exemplified in Table 10.

Although a CP type is determined based on an SCS according to the NR technical specification, in an exemplary embodiment of the present disclosure, a CP length may be determined based on at least one of the TBF and the frequency to be allocated to a specific UE, a distance between the base station and the UE, pulse duration, or a latency requirement of the terminal or a service. The distance and service latency requirement between the base station and the UE will be described with reference to FIG. 5 and FIG. 6, respectively, which will be described later.

Table 10 according to an exemplary embodiment of the present disclosure exemplifies a case in which the CP length for TBF #1 is determined as the CP #1, and this is named the Type 1 CP. In addition, the CP length for TBF #2 is determined as the CP #2, and this is named the Type 2 CP. The CP length for TBF #3 is determined as the CP #3, and this is named the Type 3 CP. The CP length for TBF #4 is determined as the CP #4, and this is named the Type 4 CP.

Meanwhile, the CP lengths according to an exemplary embodiment of the present disclosure are not limited to the four types as exemplified in Table 10. As described previously, there may be three types, or there may be five or more types.

As the TBF increases from TBF #1 to TBF #4 in the environment, a longer CP from CP #1 to CP #4 may be needed. Therefore, it can be seen that longer CP lengths are supported from the Type 1 CP to Type 4 CP. The above-mentioned operation is not limited to a single UE but can be applied in situations where multiple UEs exist, allowing the UE with a larger TBF value to have a longer CP length.

According to an exemplary embodiment of the present disclosure, when determining a required CP length, the second communication device 402 may calculate the required CP length by multiplying the pulse duration Ts of a transmitted signal by the TBF. Based on the calculated value, the second communication device 402 may select an appropriate CP type from Table 10.

According to another exemplary embodiment of the present disclosure, without being limited to the types specified in Table 10 described above, the second communication device 402 may obtain a value of the required CP length for minimizing the impact of ISI by multiplying the pulse duration Ts by a measured TBF.

According to above-described CP lengths, different CP lengths may be adopted even for one SCS. In addition, a CP length may be set differently at a specific frequency in the description in FIG. 4 and in FIG. 5 and FIG. 6 to be described below. In addition, determining of the CP length described above may be understood as ultimately determining of the CP type. Before determining the CP type, the base station may determine the pulse duration of a signal to be transmitted by the base station, a distance between the base station and the terminal, and an allocated frequency reference point, which are described above and/or will be described below.

Meanwhile, the second communication device 402 may determine a frequency resource bandwidth (BW) based on the TBF or pulse duration measurement value Ts' in the step S460. Table 11 below is an example of a relationship between TBFs and frequency bandwidths when allocating resources according to an exemplary embodiment of the present disclosure.

TABLE 11

| Temporal broadening factor (TBF) | Frequency bandwidth (MHz or GHz) |
| --- | --- |
| TBF #1 | BW #1 |
| TBF #2 | BW #2 |
| TBF #3 | BW #3 |
| TBF #4 | BW #4 |

The descriptions of Table 9 and Table 10 may be applied equally to the TBFs TBF #1, TBF #2, TBF #3, and TBF #4 in Table 11. That is, a larger TBF may ultimately mean that the impact of temporal broadening is larger.

The second communication device 402 knows a distance from the first communication device 401. When the frequency resource, CP length, and pulse duration described above are determined, and/or when a specific frequency resource, that is, a frequency reference point is determined, a frequency bandwidth based on the TBF may be determined. A method for the second communication device 402 to identify the distance from the first communication device 401 will be described in FIG. 5.

According to an exemplary embodiment of the present disclosure, the second communication device 402 may determine a frequency bandwidth based on the TBF value received from the first communication device 401 or the TBF value calculated based on the pulse duration measurement value Ts'. As described above, the larger the TBF value, the longer the CP type should be used. Accordingly, the larger the TBF value, the smaller the amount of data that can be transmitted due to the length of the CP. That is, when the second communication device 402 transmits the same data, the larger the TBF value, the longer time it takes. Therefore, the present disclosure provides a method for relatively reducing the time required for communication by allocating a wider frequency band as the TBF value increases. Therefore, the relationship between TBFs and bandwidths (BWs) exemplified in Table 11 may be as follows.

The TBFs TBF #1, TBF #2, TBF #3, and TBF #4 may have a relationship (TBF #1<TBF #2<TBF #3<TBF #4). Based thereon, the bandwidths BW #1, BW #2, BW #3, and BW #4 may be configured to have a relationship (BW #1<BW #2<BW #3<BW #4). That is, according to an exemplary embodiment of the present disclosure, as the TBF value increases, losses during data transmission may be compensated for by allocating a wider bandwidth.

According to an exemplary embodiment of the present disclosure, frequency bandwidth allocation information may be transmitted through a parameter locationAndBandwidth in an RIV of a DCI format. When the TBF increases from TBF #1 to TBF #4 in the environment, a larger frequency resource may be allocated to reduce a delay time due to the CP.

The above-described case where the second communication device 402 allocates a frequency resource for one terminal has been described. However, even when there are multiple terminals, that is, multiple first communication devices exist, a frequency resource bandwidth may be determined in the manner described above based on the TBF reported from each terminal (or the TBF calculated by the base station for each terminal).

According to an exemplary embodiment of the present disclosure, the second communication device 402 may transmit resource allocation information for communication to the first communication device 401 (S470). According to various exemplary embodiments of the present disclosure, the resource allocation information may include at least one of information on the frequency resource, CP length (or CP type), pulse duration, or bandwidth required for communication. According to an exemplary embodiment of the present disclosure, the second communication device 402 may provide information (e.g. frequency resource information and time resource information) on a resource required for communication through DCI.

In addition, the resource allocation information may be generated by taking into account a latency requirement, which will be described later in FIG. 6. The latency requirement will be described in FIG. 6.

According to another exemplary embodiment of the present disclosure, the second communication device 402 may provide information on a CP length (or CP type) at a specific frequency to the first communication device 401 using a message of an RRC procedure in the step S470. Specifically, the CP type and/or CP length may be assigned through a parameter cyclicPrefix of the RRC message.

According to another exemplary embodiment of the present disclosure, when the first communication device 401 moves toward a communication device not illustrated in FIG. 4, for example, a target base station, the second communication device 402 may provide information on a frequency resource and a CP length of the target base station.

The following description will be made assuming that the first communication device 401 performs communication within a coverage of the second communication device 402.

The first communication device 401 and the second communication device 402 may allocate the resource in the step S470 and perform communication using the allocated resource (S480). In the instant case, according to an exemplary embodiment of the present disclosure, the communication may be performed with the selected CP length in the selected frequency resource. Through this, temporal broadening caused by high frequencies may be prevented.

In the above description, with reference to FIG. 4, it was assumed that the first communication device 401 is a UE and the second communication device 402 is a base station, and the description was made based on the NR technical specifications. However, even when both the first communication device 401 and the second communication device 402 are UEs, temporal broadening that may occur when transmitting data at a high frequency can be prevented or mitigated by using the procedure of FIG. 4. In addition, when using a communication protocol other than the NR protocol, which is one of the 5G communication protocols, it is apparent to those skilled in the art that the information described in the exemplary embodiment of FIG. 4 can have the same effects when transmitted using appropriate message(s) in the corresponding communication protocol. In addition, if the information according to an exemplary embodiment of the present disclosure is applied between a base station and a terminal or between terminals in a 6G communication scheme, which is expected to use a higher frequency than that of the 5G communication, temporal broadening that may occur when data is transmitted at a high frequency can be prevented or mitigated. Through this, ISI can be reduced, thereby increasing communication efficiency.

Figure 5:
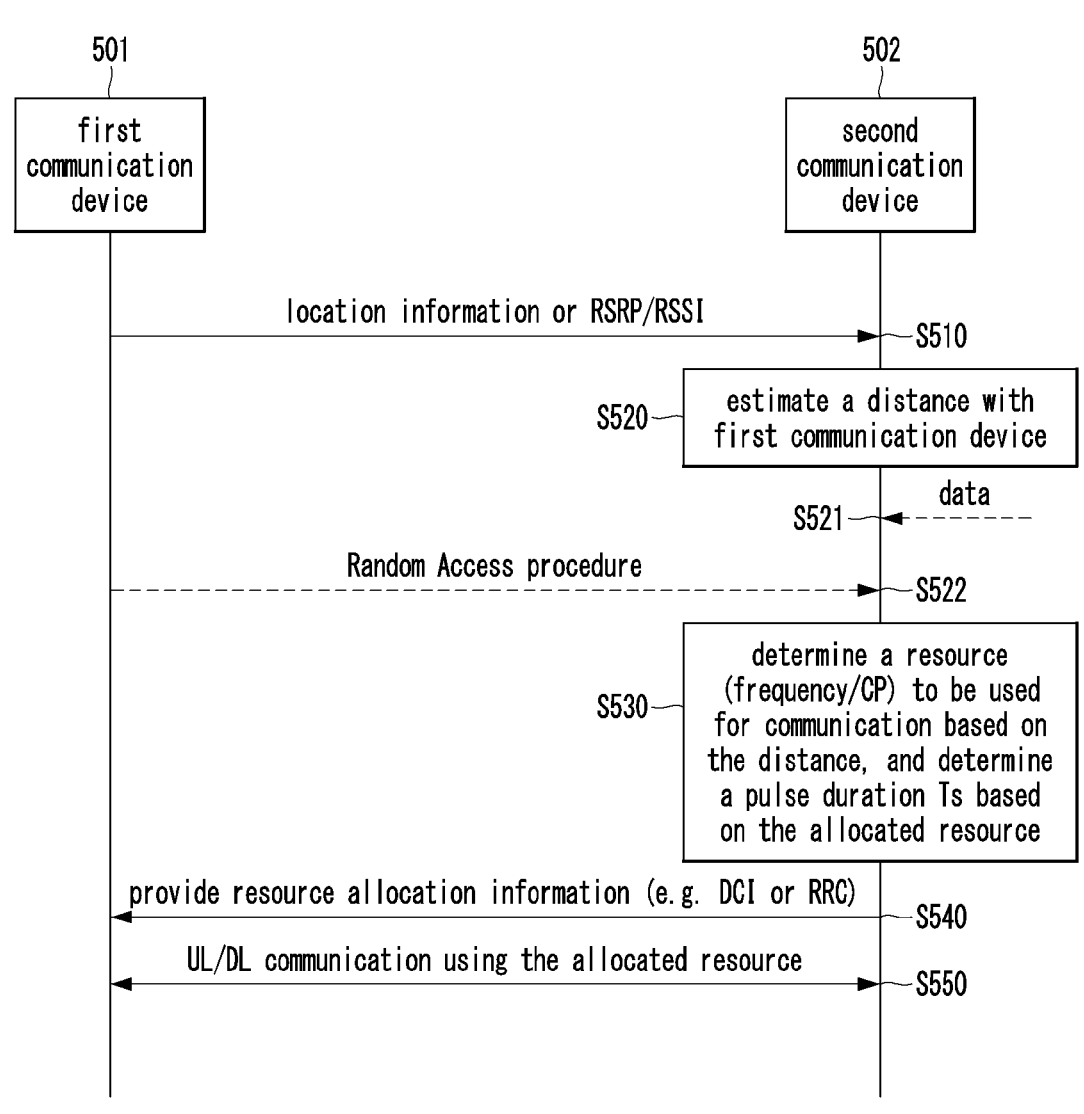
FIG. 5 is a diagram of a signal flow during communication based on a distance between communication devices according to an exemplary embodiment of the present disclosure.

FIG. 5 is a diagram of a signal flow during communication based on a distance between communication devices according to an exemplary embodiment of the present disclosure.

As shown in FIG. 5, each of a first communication device 501 and a second communication device 502 may be one of the communication devices 110-1, 110-2, 110-3, 120-1, 120-2, 130-1, 130-2, 103-3, 130-4, 130-5, 200, 401, and 402 previously described in FIGS. 1, 2, and 4. The signal flow illustrated in FIG. 5 may be applied to the NR communication, an example of 5G communication that is currently being developed and whose services are provided. In addition, it may also be used in 6G communication, which is expected to use a higher frequency band than that of the 5G communication in the future. Both the first communication device 501 and the second communication device 502 described below may be specific terminals or UEs. When the first communication device 501 and the second communication device 502 are both terminals (or UEs), a form of communication without a base station, such as direct (e.g. D2D) communication between terminals, IoT, and/or V2X, may be performed. The present disclosure may also be applied to such communication schemes between terminals. However, in the following description, for convenience of description, the first communication device 501 is assumed to be a UE, and the second communication device 502 is assumed to be a base station equipment. In particular, in the following description, for convenience of description, it is assumed that the second communication 502 is a gNB, which is a base station equipment according to the NR communication specification among various base station equipments. Therefore, in the following description, the second communication device 502 may be understood as a gNB. However, the present disclosure may also be applied to 6G communication, which is expected to use a high frequency such as NR or a higher frequency band, without being limited to the NR communication.

According to an exemplary embodiment of the present disclosure, the second communication device 502 may receive location information or RSRP/RSSI information from the first communication device 501 (S510). There may be various methods for measuring a distance between the first communication device 501 and the second communication device 502. The methods will be described first.

A case where the first communication device 501 is a UE and the second communication device 502 is a base station, that is, gNB may be assumed.

The first communication device 501 may have various forms and may be configured as a communication device such as a smart phone equipped with an equipment that can receive satellite signals. According to an exemplary embodiment of the present disclosure, the first communication device 501 capable of receiving satellite signals may receive signals respectively from a plurality of satellites, and determine a location of the first communication device 501 using the received signals. Since a method therefor is already widely known, description on a specific method will be omitted. Therefore, according to an exemplary embodiment of the present disclosure, the first communication device 501 may estimate geographic location information thereof, such as latitude, longitude, and/or altitude information, based on the signals received from the plurality of satellites. Based thereon, the first communication device 501 may provide a location information message to the second communication device 502 (S510). In addition, the second communication device 502, which is a base station, generally knows its geographical location. Therefore, the second communication device 502 may calculate the distance based on the location information provided by the first communication device 501 and the location information that the second communication device 502 already knows.

According to an exemplary embodiment of the present disclosure, the step S510 in which the first communication device 501 provides the location information to the second communication device 502 may be performed in response to a request of the second communication device 502. According to another exemplary embodiment of the present disclosure, the first communication device 501 may provide the location information at a preset periodicity based on a trigger from the second communication device 502. In FIG. 5, a trigger operation of the second communication device 502 requesting location information or periodic location information from the first communication device 501 is omitted, and only steps subsequent from the step S510 are illustrated.

According to another exemplary embodiment of the present disclosure, the first communication device 501 may receive various RSs from the second communication device 502, which is a base station. The first communication device 501 may report an RSRP and/or Received Signal Strength Indicator (RSSI), which indicates a received strength of the RS. The RSRP may refer to a signal strength of the entire received signal, and the RSSI may refer to a signal strength of a reference signal among the received signals. Therefore, the first communication device 501 may be configured to report the RSRP and/or RSSI based on a request from the second communication device 502, which is a base station, periodically or at an arbitrary time. Therefore, steps required for the first communication device 501 to report the RSRP/RSSI, for example, a step in which a measurement report request message is transmitted from the second communication device 502 and/or a step in which a reference signal (or specific signal including a reference signal) for measurement is provided from the second communication device 502 may be omitted in FIG. 5.

According to another exemplary embodiment of the present disclosure, the location of the first communication device 501 may be estimated using a positioning reference signal (PRS) used in the NR standard, one of the 5G communication standards. The second communication device 502 may provide a PRS to the first communication device 501, and the first communication device 501 may estimate its location based on the PRS. The first communication device 501 may provide information on the location estimated in the step S510. Even in the instant case, as described above, the operation of the second communication device 502 transmitting the PRS may be omitted in FIG. 5.

According to another exemplary embodiment of the present disclosure, a special message required for signal transmission between the first communication device 501 and the second communication device 502 may be defined in advance. For example, a special message (hereinafter referred to as 'round trip message') for round trip time (RTT) measurement may be defined. The round trip message for RTT measurement may be a message that performs the same function as a ping message used in wired network communication. According to an exemplary embodiment of the present disclosure, when using the round trip message, the second communication device 502 may transmit the round trip message to the first communication device 501. Thereafter, when the round trip message is received, the first communication device 501 may provide the round trip message back to the second communication device 502 without any additional processing. Therefore, the first communication device 501 may have a minimum processing time for the round trip message, and the second communication device 502 may know information on the processing time of the round trip message in advance and/or the information on the processing time of the round trip message may need to be provided by the first communication device 501 to the second communication device 502. The second communication device 502 may know the distance from the first communication device 501 by measuring a time consumed for the round trip message returned from the first communication device 501.

Hereinafter, a case where both the first communication device 501 and the second communication device 502 are terminals will be assumed.

When both the first communication device 501 and the second communication device 502 are terminals, a specific communication device, for example, a communication device that wants to measure a distance, may need to notify an adjacent communication device that it wants to measure the distance. That is, the second communication device 502 needs to inform the first communication device 501 that it wants to measure the distance. Thereafter, the second communication device 502 may transmit a specific reference signal for distance measurement or a round trip message for RTT measurement to the first communication device 501, and receive the round trip message returned from the first communication device 501. Accordingly, the second communication device 502 may estimate the distance to the first communication device 501 by considering a time from a time of transmitting the round trip message to a time of receiving the round trip message and a processing time in the first communication device 501.

In addition to the methods described above, various methods may exist to measure a distance between devices. For example, the location may be estimated based on distance(s) from specific device(s) (e.g. WiFi devices) whose fixed location(s) are known, or the distance may be calculated based on location information received from multiple satellites.

In the exemplary embodiment illustrated in FIG. 5, descriptions on operations such as transmission of a specific request, reference signal, or report request from the second communication device 502 to the first communication device 501 are omitted. The reason for omitting descriptions on these operations is, as seen above, that the operations may vary depending on what message(s) to use and/or what type the first communication device 501 and the second communication device 502 are (e.g. when both of them are UEs, or when one of them is a UE and the other is a base station). It should be noted that the descriptions thereon are omitted in FIG. 5 because it is difficult to describe all of them in one drawing.

Through one of the methods described above, the second communication device 502 may receive the location information or the information (e.g. RSRP/RSRI) that can be used for estimating the location from the first communication device 501 in the step S510.

According to an exemplary embodiment of the present disclosure, the second communication device 502 may estimate (or calculate) the distance to the first communication device 501 based on the information or signals received from the first communication device 501 (S520).

The second communication device 502 may estimate or calculate and know the distance to the first communication device 501 using at least one of the methods described above.

The second communication device 502 may identify whether data to be transmitted to the first communication device 501 is received from a higher node of the base station (S521). When data to be transmitted to the first communication device 501 is received from the higher node of the base station in the step S521, a step S530 may be performed.

The second communication device 502 may identify whether a random access procedure is being performed by the first communication device 501 (S522). If a random access procedure is performed by the first communication device 501 in the step S522, the second communication device 502 may perform the step S530.

In FIG. 5, the steps S521 and S522 are both indicated by dotted lines. This is to illustrate that one of the two steps is performed. In other words, if either the step S521 or step S522 is performed, the step S530 may be performed.

According to an exemplary embodiment of the present disclosure, the second communication device 502 may determine a resource to use based on the distance to the first communication device 501 identified through the steps S510 to S520 (S530). The second communication device 502 may allocate a frequency resource based on the distance when determining a resource to use. An allocation relationship between the distance and the frequency resource may be exemplified as shown in Table 12 below.

TABLE 12

| Distance between base station and terminal | Temporal broadening factor (TBF) | Allocated frequency band reference point |
|---|---|---|
| D #1 | TBF #1 | F #1 |
| D #2 | TBF #2 | F #2 |
| D #3 | TBF #3 | F #3 |
| D #4 | TBF #4 | F #4 |

Table 12 exemplifies a case where the distance between the second communication device 502 and the communication device 501 is classified into four sections D #1, D #2, D #3, and D #4. It should be noted that Table 12 is merely an example to describe the features of the present disclosure, and exemplary embodiments are not limited to Table 12.

In the example of Table 12, the first section D #1 may correspond to a case where the distance between the second communication device 502 and the first communication device 501 is the closest, and the fourth section D #4 may correspond to a case where the distance between the second communication device 501 and the first communication device 501 is the farthest. In order to clarify the relationship with the distances configured as the four sections D #1, D #2, D #3, and D #4, the TBFs previously described in Table 8 and Table 9 are also exemplified. In other words, the TBFs exemplified in Table 12 do not mean actual TBF values, but are for describing the relationship with the distances when the distances between the second communication device 502 and the first communication device 501 are classified into the four sections D #1, D #2, D #3, and D #4.

In addition, Table 12 shows reference points for the allocated frequency bands. Considering the TBFs, the reference point F #4 of the allocated frequency band of the first row may be the highest frequency, and the reference point F #1 of the allocated frequency band of the last row may be the lowest frequency.

A reason for allocating frequency resources as described above will be described.

The TBF, previously described in Table 8 and Table 9, may increase as the center frequency increases. The TBF may be a ratio of the pulse duration Ts of the pilot signal transmitted by the second communication device 502 to the pulse duration measurement value Ts' of the pilot signal measured by the first communication device 501. Therefore, increasement of the TBF may mean that the pulse duration measurement value Ts' of the pilot signal increases. Therefore, as the distance increases, it may be preferable to lower the pulse duration measurement value Ts' of the pilot signal by allocating a lower center frequency resource.

In an exemplary embodiment of the present disclosure, as the distance between the second communication device 502 and the first communication device 501 increases, a lower center frequency resource may be allocated, and as the distance between the second communication device 502 and the first communication device 501 decreases, a higher center frequency resource may be allocated, in order to ensure that the TBF remains constant.

Accordingly, in an exemplary embodiment of the present disclosure, the second communication device 502 may allocate a frequency resource based on the distance from the first communication device 501 as exemplified in Table 12. In the instant case, the allocated frequency resource may be a frequency resource within the same operating band or may be a frequency resource of another operating band.

In an exemplary embodiment of the present disclosure, the second communication device 502 may also determine a CP length appropriate for the frequency resource while allocating the frequency resource during resource allocation in the step S530. As previously described in FIG. 4, the CP length may be determined based on the TBF, which is the ratio of the pulse duration Ts of the pilot signal to the pulse duration measurement value Ts'. Therefore, if the temporal broadening cannot be sufficiently compensated by the frequency resource alone, the ISI may be compensated for by changing the CP length. Since the CP length has been described in FIG. 4, redundant description thereon will be omitted.

According to another exemplary embodiment of the present disclosure, the second communication device 502 may determine the pulse duration Ts based on the resource allocated in the step S530. As described above, as the frequency increases, the TBF due to temporal broadening may increase. It may be preferable to appropriately adjust the pulse duration for the pilot signal in the allocated frequency band where communication is performed according to the increase or decrease in the TBF. If the technical specification determines the pulse duration according to each frequency band, the determination of the pulse duration Ts based on the allocated resource as illustrated in the step S530 may be omitted. Even if the technical specification determines the pulse duration Ts according to each frequency band, the pulse duration may be determined by considering temporal broadening according to an exemplary embodiment of the present disclosure.

According to an exemplary embodiment of the present disclosure, when the pulse duration Ts is not determined by the technical specification or when the technical specification selectively allows the base station to determine the pulse duration, a method described in Table 13 below may be used to determine the pulse duration.

TABLE 13

| Pulse duration | Allocated frequency band reference point |
|---|---|
| PD #1 | F #1 |
| PD #2 | F #2 |
| PD #3 | F #3 |
| PD #4 | F #4 |

Table 13 exemplifies a case where the second communication device 502 classifies the pulse duration Ts into four values PD #1, PD #2, PD #3, and PD #4 according to frequency bands allocated as previously described in Table 10. The example of the four pulse durations PD #1, PD #2, PD #3, and PD #4 in Table 13 is merely an example and exemplary embodiments are not limited thereto.

In addition, Table 13 exemplifies a case where each pulse duration has a 1:1 mapping relationship with a reference point of an allocated frequency band. However, one pulse duration may be configured to correspond to two or more frequency band reference points. Therefore, the relationship between pulse durations and frequency band reference points according to an exemplary embodiment of the present disclosure should not be interpreted as limited to the example shown in Table 13.

More specifically, as previously described in Table. 11, among the four different frequency band reference points F #1, F #2, F #3, and F #4 shown in Table 13, the frequency reference point F #1 may be the lowest frequency, the frequency reference point F #2 may be the second lowest frequency reference point, the frequency reference point F

3 may be the third lowest frequency reference point, and the frequency reference point F #4 may be the highest frequency reference point.

According to an exemplary embodiment of the present disclosure, the pulse duration may have a different value depending on the frequency band. In addition, each of the four different pulse durations PD #1, PD #2, PD #3, and PD #4 may be a pulse duration for transmitting a pilot signal, as described above in FIG. 4. When communication is performed between the first communication device 501 and the second communication device 502 using a specific frequency band, a pilot signal for demodulation of data may be required. This pilot signal may be a reference signal (RS), which is defined in various forms in the NR, one of the standard protocols of the 5G communication system.

As the pulse duration increases, the TBF may decrease in the same environment (environment using the same frequency). Therefore, it may be preferable to increase the pulse duration as the frequency increases. In Table 12, the four different pulse durations PD #1, PD #2, PD #3, and PD #4 having an one-to-one mapping relationship with the respective frequencies may show that the pulse duration increases as the frequency increases. Therefore, the four pulse durations PD #1, PD #2, PD #3, and PD #4 shown in Table 12 may have a relationship of (PD #1<PD #2<PD #3<PD #4).

Meanwhile, the operation of allocating a frequency based on a pulse duration may not be configured according to the relationship with the distance described in FIG. 5, but may be configured in a different form. For example, the pulse durations PD #1, PD #2, PD #3, and PD #4 may be determined based on the pulse durations in the initial access process described in FIG. 4. That is, in the operation of step S460, the second communication device 402 may allocate the frequency in the manner shown in Table 13 based on the pulse duration. When determining the frequency according to the pulse duration in the step S460, at least one other factor mentioned in the step S460 (e.g. pulse duration measurement value Ts' and/or TBF and/or CP length) may be considered additionally.

According to another exemplary embodiment of the present disclosure, the second communication device 502 may consider only the pulse durations PD #1, PD #2, PD #3, and PD #4 and use the method described in Table 13 to allocate a frequency resource. In the instant case, the terminal, that is, the first communication device 501, may be in a state after being transitioned from the RRC active state to the RRC idle state and/or RRC inactive state after first connecting to the second communication device 502.

According to an exemplary embodiment of the present disclosure, a case when communication needs to be resumed with the first communication device 501 in the RRC idle state and/or RRC inactive state may correspond to the case described in the step S521 or S522. Specifically, the case may correspond to the case when data to be transmitted to the first communication device 501 is received from the network as in the step S521, or the case when a random access procedure is performed by the first communication device 501 as in the step S522.

In the instant case, the pulse duration may be determined based on a frequency to be allocated to the first communication device 501, as exemplified in Table 13. For example, if the second communication device 502 needs to allocate a high frequency resource to the first communication device 501, a long pulse duration may be allocated. On the other hand, if the second communication device 502 needs to allocate a low frequency resource to the first communication device 501, a short pulse duration may be allocated.

According to an exemplary embodiment of the present disclosure, the second communication device 502 may transmit resource allocation information for communication to the first communication device 501 (S540). According to various exemplary embodiments of the present disclosure, the resource allocation information for communication may include at least one of information on a frequency resource, CP length (or CP type), pulse duration, center frequency, or bandwidth required for communication.

In addition, since communication is required according to the example of FIG. 5 as in the steps S521 and/or S522, the resource allocation information may be provided through a specific control channel. In case of the 5G communication systems, the specific control channel may be a physical downlink control channel (PDCCH). More specifically, the resource allocation information may be provided to the first communication device 501 through DCI of the PDCCH. When using the DCI, at least some of the resource allocation information may use a parameter loactionanAndBandwidth of an RIV. According to another exemplary embodiment of the present disclosure, an RRC message may be used when a change of a base station or reselection of a cell is required for communication. The second communication device 502 may use a parameter offsetToCarrier when transmitting at least part of the resource allocation information using an RRC message. According to another exemplary embodiment of the present disclosure, frequency band reference point allocation information, which is one of the resource allocation information, may be transmitted through a system information block 1 (SIB1).

The frequency allocation method described in FIG. 5 may be used as described above for one terminal, that is, the first communication device 501, and when a plurality of terminals exist, a frequency may be allocated to each of the plurality of terminals based on a distance from the second communication device 502 that is a base station. For example, frequency bands may be allocated to the plurality of terminals, respectively, based on the distance sections from the base station as shown in Table 13. In addition, if exceeding the number of resources that can be allocated to a specific section, priorities may be determined by considering states of the terminals, grades (e.g. charging grade, etc.) of the terminals, and required QoS for the terminals. According to another exemplary embodiment of the present disclosure, the priorities may be determined according to the urgency of the required services.

According to an exemplary embodiment of the present disclosure, a frequency band capable of preventing temporal broadening, that is, a lower frequency band, may be preferentially allocated to a high priority terminal, and a higher frequency band may be allocated to a low priority terminal even if a distance therefrom is farther than the distance shown in Table 12. Specifically, if a TBF value reported from a specific UE corresponds to TBF #2, F #3 may be allocated. However, if there is only a resource F #2 or F #1 that the base station can allocate to the corresponding UE (based on the priority), the base station may allocate F #2 to the corresponding UE. When a frequency higher than a frequency band reference point to be allocated is selected as described above, quality degradation due to temporal broadening may be prevented by setting the CP length longer for the corresponding resource in the step S530.

The second communication device 502 may transmit resource allocation information for communication to the first communication device 501 through a control channel or control message in the step S540. The resource allocation information transmitted by the second communication device 502 in the step S540 may include information on the frequency resource and CP length determined in the step S530. Even in the instant case, if the CP length (or CP type) for a specific frequency resource is predetermined as described above in FIG. 4, the second communication device 502 may not provide information on the CP length (or CP type).

Thereafter, the first communication device 501 and the second communication device 502 may perform communication using the allocated resource (S550). Here, according to an exemplary embodiment of the present disclosure, communication may be performed based on the CP length (or CP type) and pulse duration selected in the selected frequency resource. This may prevent temporal broadening caused by high frequencies.

Meanwhile, the exemplary embodiment of FIG. 5 described above may be considered together with the exemplary embodiment of FIG. 4. In FIG. 4, the distance between the first communication device 401 and the second communication device 402 has been briefly described. This may mean that the operation of FIG. 5 may be applied to the operation of FIG. 4.

Figure 6:
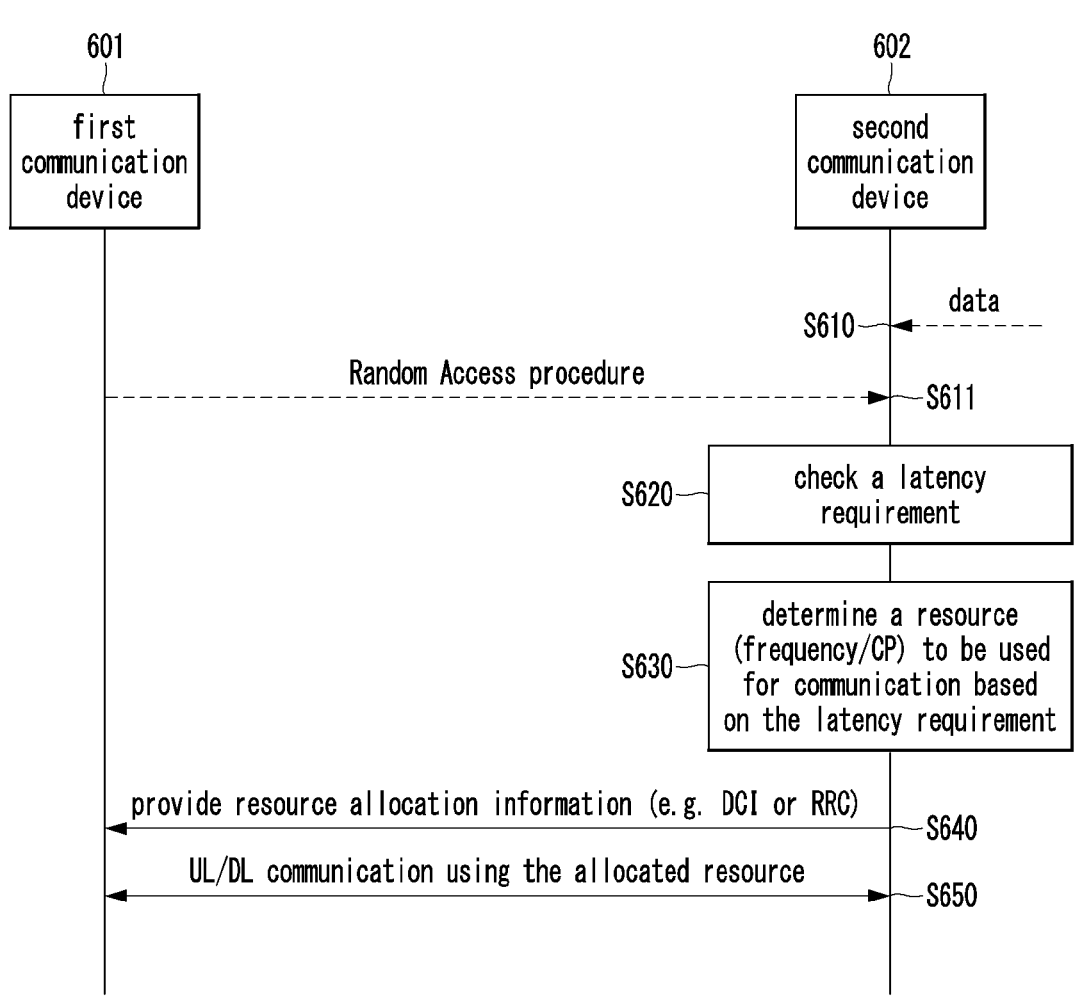
FIG. 6 is a diagram of a signal flow during resource allocation and communication based on a latency requirement according to an exemplary embodiment of the present disclosure.

FIG. 6 is a diagram of a signal flow during resource allocation and communication based on a latency requirement according to an exemplary embodiment of the present disclosure.

As shown in FIG. 6, each of a first communication device 601 and a second communication device 602 may be at least one of the communication devices 110-1, 110-2, 110-3, 120-1, 120-2, 130-1, 130-2, 130-3, 130-4, 130-5, 200, 401, 402, 501, and 502 previously described in FIG. 1 and FIG. 2. The signal flow illustrated in FIG. 6 may be applied to the NR communication, an example of 5G communication that is currently being developed and whose services are provided. In addition, it may also be used in 6G communication, which is expected to use a higher frequency band than the 5G communication in the future. Both the first communication device 601 and the second communication 602 described below may be specific terminals and/or UEs. When the first communication device 601 and the second communication device 602 are both terminals (or UEs), a form of communication without a base station, such as direct (e.g. D2D) communication between terminals, IoT, and/or V2X, may be performed. The present disclosure may also be applied to such communication schemes between terminals. However, in the following description, for convenience of description, the first communication device 561 is assumed to be a UE, and the second communication device 602 is assumed to be a base station equipment. In particular, in the following description, for convenience of description, it is assumed that the second communication 602 is a gNB, which is a base station equipment according to the NR communication specification among various base station equipments. Therefore, in the following description, the second communication device 602 may be understood as a gNB. However, the present disclosure may also be applied to 6G communication, which is expected to use a high frequency such as NR or a higher frequency band, without being limited to the NR communication.

According to an exemplary embodiment of the present disclosure, the second communication device 602 may identify whether data to be transmitted to the first communication device 601 is received from a higher node of the base station (S610). When data to be transmitted to the first communication device 601 is received from the higher node of the base station in the step S610, a step S620 may be performed.

The second communication device 602 may identify whether a random access procedure is being performed by the first communication device 601 (S611). If a random access procedure is performed by the first communication device 601 in the step S611, the second communication device 602 may perform the step S620.

In FIG. 6, the steps S610 and S611 are both indicated by dotted lines. This is to illustrate that one of the two steps is performed. In other words, if either the step S610 or step S611 is performed, the step S620 may be performed.

According to an exemplary embodiment of the present disclosure, the second communication device 602 may check a latency requirement for communication with the first communication device 601 (S620). The latency requirement may vary mainly depending on characteristics of a service. The NR system can provide enhanced Mobile Broadband (eMBB) services for high-speed data transmission, Ultra Reliable Low Latency Communication (URLLC) services, and massive Machine Type Communications (mMTC) services. In such communications, the eMBB services generally have characteristics that are not sensitive to latency. However, the URLLC services basically aim for low latency and are designed not to take latency into account. In addition, in the case of the mMTC services, there are services that are quite time-sensitive depending on conditions. For example, Time Sensitive Networking (TSN) may be combined with mobile communication services and require low-latency factory automation. In addition, in general, VoIP services may belong to the eMBB services, but may be time-sensitive services. The terminal's latency requirement may be determined by how much latency can be tolerated based on a required service rather than the characteristics of the terminal.

According to an exemplary embodiment of the present disclosure, the second communication device 602 may check a latency requirement level for a service of data received in the step S610 to be provided to the first communication device 601 before checking the latency requirement in the step S620.

According to another exemplary embodiment of the present disclosure, when checking the latency requirement in the step S620, the second communication device 602 may check the latency requirement based on a type of service requested through a random access procedure from the first communication terminal 601 in the step S611. If the second communication device 602 cannot identify the latency requirement for the type of service requested by the first communication device 601 through the random access procedure, the second communication device 602 may identify the latency requirement by using a portion of required QoS information provided from a higher network when the second communication device 602 establishes higher network connection with the first communication device 601.

According to another exemplary embodiment of the present disclosure, the second communication device 602 may identify a latency required by the first communication device 601 itself. For example, communication devices for specific purposes, such as fire alarm devices, automatic tsunami warning devices, and security alarm devices, may have their own latency requirements. In the present disclosure, it is possible to identify the latency requirement for the communication device itself.

The second communication device 602 may allocate a resource based on the identified latency requirement. A relationship between allocated frequency resources and latency requirements may be exemplified as shown in Table 14 below.

TABLE 14

| Latency requirement | Allocated frequency band reference point |
|---|---|
| LR #1 | F #1 |
| LR #2 | F #2 |
| LR #3 | F #3 |
| LR #4 | F #4 |

Table 14 exemplifies a form in which the terminal's latency requirements LR #1, LR #2, LR #3, and LR #4 are mapped to frequency band reference points in an one-to-one manner. However, one frequency band reference point may be mapped to two or more terminal latency requirements, and one terminal latency requirement may be mapped to two or more frequency band reference points. That is, Table 14 is merely for describing the concept of the present disclosure, and the present disclosure should not be limited to the examples in Table 14.

More specifically, as described in Table 12 and Table 13, among the four frequency band reference points F #1, F #2, F #3, and F #4, the frequency reference point F #1 may be the lowest frequency reference point, the frequency reference point F #2 may be the second lowest frequency reference point, the frequency reference point F #3 may be the third lowest frequency reference point, and the frequency reference point F #4 may be the highest frequency reference point.

In addition, the four different latency requirements LR #1, LR #2, LR #3, and LR #4 in Table 14 may be latency requirements configurable depending on the service requested by the first communication device 601 (in case of S611), the service to be provided to the first communication device 601 (in case of S610), or the characteristics of the first communication device 601 itself (in case of a dedicated terminal as described above). Accordingly, two or more different UEs may receive services with the same latency requirement. That is, the same service or different services with the same latency requirement may be provided to two or more UEs. The different latency requirements LR #1, LR #2, LR #3, and LR #4 may require different CP lengths (or CP types). For example, a lower frequency needs to be allocated to a UE to which a service with a shorter latency requirement should be provided. As described above, the fact that a lower frequency is required means that a relatively short CP length is required.

Based thereon, the latency requirements LR #1, LR #2, LR #3, and LR #4, that is, required latencies, may have a relationship (LR #1<LR #2<LR #3<LR #4). Specifically, it means a latency of the latency requirement LR #1 may be shorter than that of the latency requirement LR #2. The lowest frequency band reference point may be allocated to a service or UE with the shortest latency requirement LR #1.

In addition, as described above, when the number of a plurality of UEs having the same latency requirement exceeds the number of frequency resources that can be allocated for the latency requirement, resources may be allocated based on priorities thereof. In the instant case, the priorities may be determined as described above. For example, the priorities may be determined by considering the states of the terminals, grades (e.g. charging grades, etc.) of the terminals, and required QoS for the terminals.

According to another exemplary embodiment of the present disclosure, the priority may be determined according to the urgency of the required service.

According to another exemplary embodiment of the present disclosure, the priority may be determined by considering the urgency of the required service, the state of the terminal, the grade (e.g. charging grade, etc.) of the terminal, and the quality of the required service.

According to an exemplary embodiment of the present disclosure, when services need to be provided based on latency requirements from a plurality of UEs, the base station, that is, the second communication device 602 may allocate required frequency resources as in the method shown in Table 14. In the instant case, if services exceeding frequency resources that can be allocated by the second communication device 602 are required, resources may be allocated based on the priorities described above, and services may be denied to UEs that do not meet the requirements. Alternatively, higher frequency resources may be allocated to the UEs that do not meet the requirements.

According to an exemplary embodiment of the present disclosure, if the second communication device 602 cannot allocate frequencies by using a predetermined table such as Table 14, the second communication device 602 may allocate a frequency of a higher band. When allocating a higher frequency band, the second communication device 602 may allocate a resource by changing a CP length (or CP type) as described in FIG. 4 and increasing the pulse duration as described in FIG. 5. This can prevent quality deterioration due to temporal broadening.

According to an exemplary embodiment of the present disclosure, the second communication device 602 may transmit resource allocation information for communication to the first communication device 601 (S640). According to various exemplary embodiments of the present disclosure, the resource allocation information for communication may include at least one of information a frequency resource, CP length (or CP type), pulse duration, center frequency, or bandwidth required for communication.

In addition, since communication is required according to the example of FIG. 6 as in the steps S610 and/or S611, the resource allocation information may be provided through a specific control channel. In case of the 5G communication systems, the specific control channel may be a PDCCH. More specifically, the resource allocation information may be provided to the first communication device 601 through DCI of the PDCCH. When using the DCI, a parameter loactionanAndBandwidth of an RIV may be used. According to another exemplary embodiment of the present disclosure, the second communication device 602 may transmit at least part of the resource allocation information to the first communication device 601 by using an RRC message when a change of a base station or reselection of a cell is required for communication. The second communication device 602 may use a parameter offsetToCarrier when transmitting at least part of the resource allocation information using the RRC message. According to another exemplary embodiment of the present disclosure, frequency band reference point allocation information, which is one of the resource allocation information, may be transmitted through an SIB1.

The frequency allocation method may be used as described above for one terminal, that is, the first communication device 501, and when a plurality of terminals exist, a frequency may be allocated to each of the plurality of terminals or a service requested by each of the plurality of terminals based on the latency requirement.

The second communication device 602 may transmit resource allocation information for communication to the first communication device 601 through a control channel or control message in the step S640. The resource allocation information transmitted by the second communication device 602 in the step S640 may include information on the frequency resource and CP length determined in the step S630. Even in the instant case, if the CP length (or CP type) for a specific frequency resource is predetermined as described above in FIG. 4, the second communication device 602 may not provide information on the CP length (or CP type).

Thereafter, the first communication device 601 and the second communication device 602 may perform communication using the allocated resource (S650). Here, according to an exemplary embodiment of the present disclosure, communication may be performed based on the selected CP length (or CP type) in the selected frequency resource. This may prevent temporal broadening caused by high frequencies.

In FIG. 6 described above, the relationship between latency requirements, TBFs, and frequency band reference points has been described. However, it can be seen that FIG. 4, FIG. 5 and FIG. 6 can be comprehensively and selectively considered in one flow for allocating communication resources. That is, some of the contents described in FIG. 4, FIG. 5, and FIG. 6 may be selected and considered when allocating communication resources.

Figure 7:
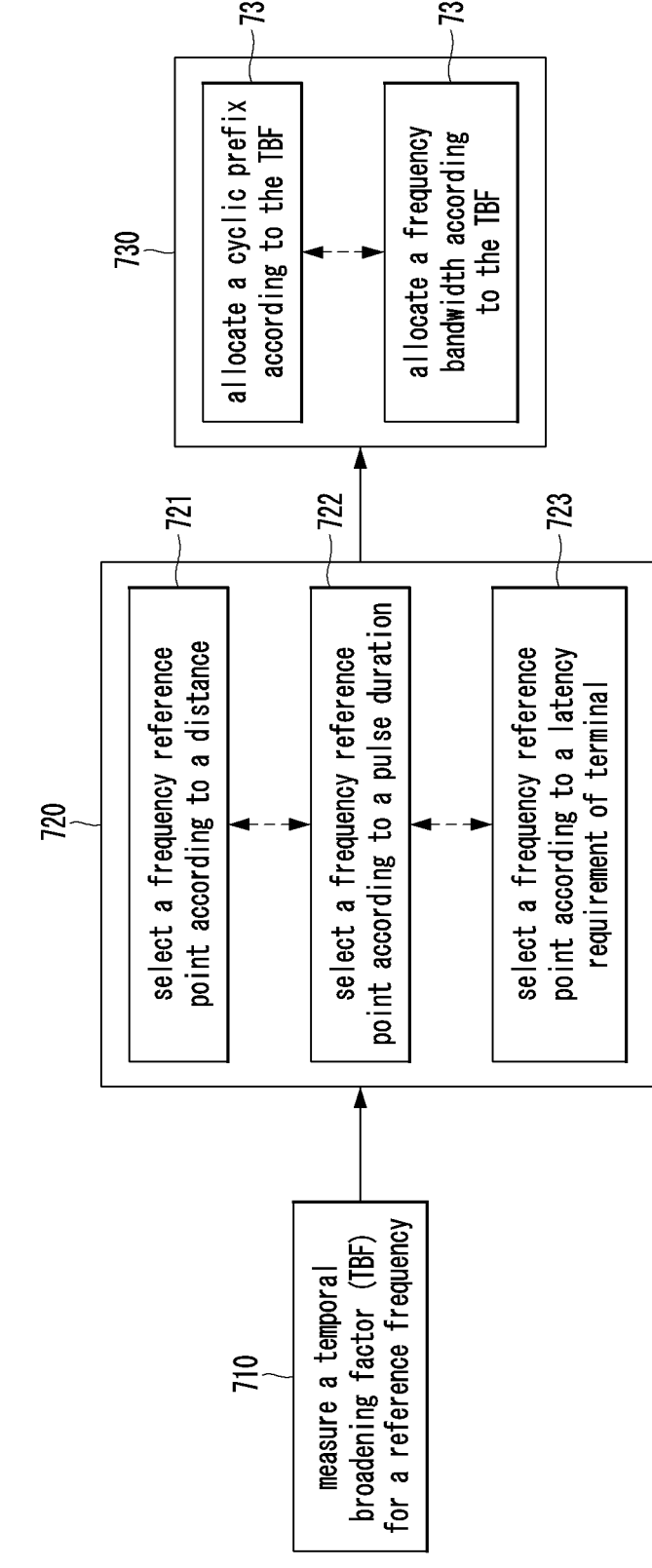
FIG. 7 is a block diagram illustrating methods for allocating resources according to an exemplary embodiment of the present disclosure.

FIG. 7 is a block diagram illustrating methods for allocating resources according to an exemplary embodiment of the present disclosure.

As shown in FIG. 7, a TBF for a specific reference frequency may be measured (S710). According to an exemplary embodiment of the present disclosure, measurement of a TBF for a specific reference frequency may correspond to at least part of the operation performed between the first communication device 401 and the second communication device 402 through the steps S410 to S430 of FIG. 4. For example, the step S410 among the steps S410 to S430 of FIG. 4 may be an optional step of the standard protocol. In addition, the operation in the step 710 may be performed in the same manner for other reference frequencies while the operation is performed for one specific reference frequency.

According to an exemplary embodiment of the present disclosure, a frequency reference point may be determined in the step 720 by using at least one factor among several factors.

Specifically, a frequency reference point may be determined according to the distance (S721). As previously described in FIG. 5, the distance may be estimated using the method described in the steps S510 and S520, and a frequency reference point may be selected based thereon.

The frequency reference point may be selected according to the pulse duration (S722). As a method of selecting the frequency reference point according to the pulse duration, the method described in the step S420 of FIG. 4, or the method described in the step S530 of FIG. 5 may be used.

The frequency reference point may be selected considering the latency requirement of the terminal. To select the frequency reference point based on the latency requirement of the terminal, the method described in the steps S620 to S630 of FIG. 6 may be used.

According to an exemplary embodiment of the present disclosure, as in the step 720, it can be seen that the frequency reference point selection may be based on one of the distance, pulse duration, and latency requirement of the terminal (or service). The frequency reference point may be determined by considering two or all three of the three factors above. For example, the frequency reference point may be determined by considering the distance and pulse duration. As another example, the frequency reference point may be determined by considering the distance and the latency requirement of the terminal (or service). As yet another example, the frequency reference point may be determined by considering the pulse duration and the latency requirement of the terminal (or service).

When two or more factors are considered as described above, one of the two factors may be considered first, and the other factor may be considered as a more detailed factor in determining the frequency reference point. Therefore, even when all three factors are considered, the frequency reference point may be determined in the same manner.

Once the frequency reference point is determined as described above, a resource may be allocated at the corresponding frequency reference point. According to an exemplary embodiment of the present disclosure, when allocating a resource in a step 730, a CP may be allocated based on the TBF (S731) or a frequency bandwidth may be allocated based on the TBF.

According to an exemplary embodiment of the present disclosure, CP allocation may mean a procedure for determining the CP length or CP type, and the CP length (or CP type) may be determined in the manner described in the step S460 of FIG. 4, step S530 of FIG. 5, and step S630 of FIG. 6.

According to an exemplary embodiment of the present disclosure, frequency bandwidth allocation may mean a procedure for determining a frequency bandwidth (BW) as described in the step S460 of FIG. 4. An example of such bandwidth allocation has been described in Table 11 above, so the redundant description will be omitted.

Also in the step S730 of FIG. 7, only the CP may be determined, both the CP and frequency bandwidth may be determined, or only the frequency bandwidth may be determined as in the step S720. Since this can be understood based on the previously described FIG. 4, FIG. 5 and FIG. 6, the redundant description will be omitted.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An operation method of a first communication node in a communication system, the operation method comprising:
transmitting a first signal block including a pilot signal at a preset periodicity;
receiving information on a temporal broadening of the pilot signal from a second communication node;
allocating a communication resource to the second communication node based on the information on the temporal broadening in response that a communication with the second communication node is required; and
communicating with the second communication node using the allocated communication resource,
wherein in the allocating of the communication resource, the communication resource is allocated to the second communication node based on a predetermined mapping rule, and the predetermined mapping rule is configured to:
divide ratios of a transmission time Ts of the pilot signal to a time Ts' during which the pilot signal is measured at the second communication node into n predetermined ranges wherein the n is 2 or more;
divide frequency resources allocatable by the first communication node into the n ranges;
map the frequency resources to the n ranges of the ratios in order from high to low frequencies; and
map the ratios of the transmission time Ts of the pilot signal to the time Ts' during which the pilot signal is measured at the second communication node to the n ranges from small to high values.

2. The operation method of claim 1, wherein the information on the temporal broadening is information on the time Ts' during which the pilot signal is measured at the second communication node.

3. The operation method of claim 1, wherein the first signal block includes information on the transmission time Ts of the pilot signal.

4. The operation method of claim 3, wherein the information on the temporal broadening is information on a ratio of the transmission time Ts of the pilot signal to the time Ts' during which the pilot signal is measured at the second communication node.

5. The operation method of claim 1, wherein in response that the first communication node communicates in an Orthogonal Frequency Division Multiplexing (OFDM) scheme, the first communication node determines one of three or more types of Cyclic Prefix (CP) symbol based on the information on the temporal broadening in allocating the communication resource.

6. The operation method of claim 1, wherein in the allocating of the communication resource, the communication resource is allocated to the second communication node based on a second predetermined mapping rule, and the second predetermined mapping rule is configured to:
divide distances between the first communication node and the second communication node into a predetermined plurality of first ranges;
divide the frequency resources allocatable by the first communication node into the first ranges from high to low frequencies;
map the frequency resources to the first ranges in order from high to low frequencies; and
map the distances to the first ranges from a closest distance to a farthest distance.

7. The operation method of claim 1, wherein the communication resource is allocated based on a latency requirement of a service requested by the second communication node in allocating the communication resource.

8. The operation method of claim 1, further comprising:
transmitting information on a frequency resource set for transmitting the pilot signal before transmitting the first signal block.

9. A first communication node in a communication system, comprising:
a transceiver configured to transmit and receive signals to and from at least one second communication node; and
at least one processor,
wherein the at least one processor is configured to:
control the transceiver to transmit a first signal block including a pilot signal at a preset periodicity;
control the transceiver to receive information on a temporal broadening of the pilot signal from the at least one second communication node;
allocate a communication resource to the at least one second communication node based on the information on the temporal broadening in response that a communication with the at least one second communication node is required; and
control the transceiver to communicate with the at least one second communication node via the allocated communication resource,
wherein the at least one processor allocates the communication resource to the at least one second communication node based on a predetermined mapping rule, and the predetermined mapping rule is configured to:
divide ratios of a transmission time Ts of the pilot signal to a time Ts' during which the pilot signal is measured at the at least one second communication node into n predetermined ranges wherein the n is 2 or more;
divide frequency resources allocatable by the first communication node into the n ranges;
map the frequency resources to the n ranges of the ratios in order from high to low frequencies; and
map the ratios of the transmission time Ts of the pilot signal to the time Ts' during which the pilot signal is measured at the at least one second communication node to the n ranges from small to high values.

10. The first communication node of claim 9, wherein the information on the temporal broadening is information on the time Ts' during which the pilot signal is measured at the at least one second communication node.

11. The first communication node of claim 9, wherein the first signal block includes information on the transmission time Ts of the pilot signal.

12. The first communication node of claim 11, wherein the information on the temporal broadening is information on a ratio of the transmission time Ts of the pilot signal to the time Ts' during which the pilot signal is measured at the at least one second communication node.

13. The first communication node of claim 9, wherein in response that the first communication node communicates in an Orthogonal Frequency Division Multiplexing (OFDM) scheme, the at least one processor determines one of three or more types of Cyclic Prefix (CP) symbol based on the information on the temporal broadening in allocating the communication resource.

14. The first communication node of claim 9, wherein the at least one processor allocates the communication resource to the at least one second communication node based on a second predetermined mapping rule, and the second predetermined mapping rule is configured to:

divide distances between the first communication node and the at least one second communication node into a predetermined plurality of first ranges;

divide the frequency resources allocatable by the first communication node into the first ranges from high to low frequencies;

map the frequency resources to the first ranges in order from high to low frequencies; and map the distances to the first ranges from a closest distance to a farthest distance.

15. The first communication node of claim 9, wherein the at least one processor allocates the communication resource based on a latency requirement of a service requested by the at least one second communication node or a service to be provided to the at least one second communication node in allocating the communication resource.

16. The first communication node of claim 9, wherein the at least one processor further transmits information on a frequency resource set for transmitting the pilot signal before transmitting the first signal block.

17. An operation method of a first communication node in a communication system, the operation method comprising:

receiving a first signal block including a pilot signal from a second communication node;

measuring information on a temporal broadening based on a reception time of the pilot signal;

providing the information on the temporal broadening to the second communication node; and in response to a communication resource allocated by the second communication node, communicating with the second communication node based on the allocated resource, wherein the communication resource is allocated by the second communication node based on a predetermined mapping rule, and the predetermined mapping rule is configured to:

divide ratios of a transmission time Ts of the pilot signal to a time Ts' during which the pilot signal is measured at the second communication node into n predetermined ranges wherein the n is 2 or more;

divide frequency resources allocatable by the first communication node into the n ranges;

map the frequency resources to the n ranges of the ratios in order from high to low frequencies; and map the ratios of the transmission time Ts of the pilot signal to the time Ts' during which the pilot signal is measured at the second communication node to the n ranges from small to high values.

18. The operation method of claim 17, wherein the information on the temporal broadening is information on a ratio of a transmission time Ts of the pilot signal to the time Ts' during which the pilot signal is measured.

\*   \*   \*   \*   \*